United States Patent
Blouin et al.

(10) Patent No.: US 10,595,624 B2
(45) Date of Patent: Mar. 24, 2020

(54) CLEANING ROLLER FOR CLEANING ROBOTS

(71) Applicant: iRobot Corporation, Bedford, MA (US)

(72) Inventors: Matthew Blouin, Townsend, MA (US); Pierre Paul Richard Souloumiac, Somerville, MA (US); Pu Zhou, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 170 days.

(21) Appl. No.: 15/659,345

(22) Filed: Jul. 25, 2017

(65) Prior Publication Data
US 2019/0029409 A1    Jan. 31, 2019

(51) Int. Cl.
*A46B 13/00* (2006.01)
*A47L 11/40* (2006.01)
(Continued)

(52) U.S. Cl.
CPC ............ *A46B 13/003* (2013.01); *A47L 9/009* (2013.01); *A47L 9/0411* (2013.01); *A47L 9/0477* (2013.01); *A47L 9/0488* (2013.01); *A47L 11/4041* (2013.01); *A47L 11/4044* (2013.01); *B25J 9/0003* (2013.01); *B25J 11/0085* (2013.01); *A47L 2201/00* (2013.01); *A47L 2201/04* (2013.01)

(58) Field of Classification Search
CPC ...... A47L 9/0477; A47L 9/04; A47L 11/4041; A47L 11/4044
USPC .......................................................... 15/179
See application file for complete search history.

(56) References Cited

U.S. PATENT DOCUMENTS 1,829,548 A    10/1931  Smellie et al.
1,919,067 A *   7/1933  Lang .................. A47L 9/0477
                                                           15/383
(Continued)

FOREIGN PATENT DOCUMENTS

DE         4400956        10/1994
DE    102015117083 A1 *   4/2017  ........... A47L 9/0477
(Continued)

OTHER PUBLICATIONS

Machine Translation of DE102015117083 (Year: 2017).*
International Search Report and Written Opinion in International Application No. PCT/US2018/43681, dated Oct. 1, 2018, 11 pages.

*Primary Examiner* — Orlando E Aviles
*Assistant Examiner* — Robert F Neibaur
(74) *Attorney, Agent, or Firm* — Fish & Richardson P.C.

(57) ABSTRACT

A cleaning roller is mountable to a cleaning robot. The cleaning roller includes a sheath comprising a shell, an outer diameter of the shell tapering from a first end portion of the sheath and a second end portion of the sheath toward a center of the roller. The cleaning roller further includes a core including a central portion interlocked with the sheath to rotationally couple the core to the sheath and inhibit relative translation of the sheath and the core along an axis of rotation. An inner surface of the sheath and an outer surface of the core define an air gap therebetween, the air gap extending from the central portion of the core longitudinally along the axis of rotation toward the first end portion or the second end portion.

23 Claims, 17 Drawing Sheets

(51) Int. Cl.
 *B25J 9/00*  (2006.01)
 *B25J 11/00* (2006.01)
 *A47L 9/00*  (2006.01)
 *A47L 9/04*  (2006.01)

(56) References Cited

U.S. PATENT DOCUMENTS

| | | | |
|---|---|---|---|
| 2,064,856 A | 12/1936 | Riebel | |
| 2,298,682 A | 10/1942 | Dahlstom et al. | |
| 2,578,549 A | 12/1951 | Hooban | |
| 2,770,825 A | 11/1956 | Kuroki et al. | |
| 2,881,461 A | 4/1959 | Parker et al. | |
| 4,401,909 A | 8/1983 | Gorsek | |
| 4,552,505 A | 11/1985 | Gorman | |
| 4,679,152 A | 7/1987 | Perdue | |
| 4,908,898 A | 3/1990 | Kudo | |
| 4,918,441 A | 4/1990 | Bohman | |
| 4,962,453 A | 10/1990 | Pong, Jr. et al. | |
| 5,086,535 A | 2/1992 | Grossmeyer et al. | |
| 5,109,566 A | 5/1992 | Kobayashi et al. | |
| 5,204,814 A | 4/1993 | Noonan et al. | |
| 5,216,777 A | 6/1993 | Moro et al. | |
| 5,233,682 A | 8/1993 | Abe et al. | |
| 5,251,358 A | 10/1993 | Moro et al. | |
| 5,284,522 A | 2/1994 | Kobayashi et al. | |
| 5,321,614 A | 6/1994 | Ashworth | |
| 5,341,540 A | 8/1994 | Soupert et al. | |
| 5,365,634 A | 11/1994 | Hughes | |
| 5,410,479 A | 4/1995 | Coker | |
| 5,495,634 A | 3/1996 | Brundula et al. | |
| 5,507,067 A | 4/1996 | Hoeskstra et al. | |
| 5,515,572 A | 5/1996 | Hoeskstra et al. | |
| 5,536,953 A | 7/1996 | Kurz | |
| 5,542,146 A | 8/1996 | Hoekstra et al. | |
| 5,548,511 A | 8/1996 | Bancroft | |
| 5,613,261 A | 3/1997 | Kawakami et al. | |
| 5,646,494 A | 7/1997 | Han | |
| 5,682,313 A | 10/1997 | Edlund et al. | |
| 5,710,506 A | 1/1998 | Broell et al. | |
| 5,813,086 A | 9/1998 | Ueno et al. | |
| 5,815,884 A | 10/1998 | Imamura et al. | |
| 5,867,800 A | 2/1999 | Leif | |
| 5,910,700 A | 6/1999 | Crotzer | |
| 5,935,179 A | 8/1999 | Kleiner et al. | |
| 5,942,869 A | 8/1999 | Katou et al. | |
| 5,959,423 A | 9/1999 | Nakanishi et al. | |
| 6,055,702 A | 5/2000 | Imamura et al. | |
| 6,076,025 A | 6/2000 | Ueno et al. | |
| 6,076,227 A | 6/2000 | Schallig et al. | |
| 6,091,219 A | 7/2000 | Maruo et al. | |
| 6,108,853 A * | 8/2000 | Dittus | A47L 9/0477 15/141.2 |
| 6,212,732 B1 | 4/2001 | Tajima et al. | |
| 6,220,865 B1 | 4/2001 | Macri et al. | |
| 6,278,918 B1 | 8/2001 | Dickson et al. | |
| 6,285,930 B1 | 9/2001 | Dickson et al. | |
| 6,321,337 B1 | 11/2001 | Reshef et al. | |
| 6,323,570 B1 | 11/2001 | Nishimura et al. | |
| 6,370,453 B2 | 4/2002 | Sommer | |
| 6,385,515 B1 | 5/2002 | Dickson et al. | |
| 6,389,329 B1 | 5/2002 | Colens | |
| 6,400,048 B1 | 6/2002 | Nishimura et al. | |
| 6,437,465 B1 | 8/2002 | Nishimura et al. | |
| 6,459,955 B1 | 10/2002 | Bartsch et al. | |
| 6,463,368 B1 | 10/2002 | Feiten et al. | |
| 6,470,237 B2 | 10/2002 | Fujita et al. | |
| 6,490,539 B1 | 12/2002 | Dickson et al. | |
| 6,505,341 B1 | 1/2003 | Harris et al. | |
| 6,556,892 B2 | 4/2003 | Kuroki et al. | |
| 6,574,536 B1 | 6/2003 | Kawagoe et al. | |
| 6,584,376 B1 | 6/2003 | Van Kommer | |
| 6,671,592 B1 | 12/2003 | Bisset et al. | |
| 6,690,134 B1 | 2/2004 | Jones et al. | |
| 6,742,220 B2 | 6/2004 | Nagai et al. | |
| 6,781,338 B2 | 8/2004 | Jones et al. | |
| 6,809,490 B2 | 10/2004 | Jones et al. | |
| 6,845,297 B2 | 1/2005 | Allard | |
| 6,883,201 B2 | 4/2005 | Jones et al. | |
| 7,027,893 B2 | 4/2006 | Perry et al. | |
| 7,085,623 B2 | 8/2006 | Sigers | |
| 7,147,238 B2 | 12/2006 | Oi | |
| 7,159,276 B2 | 1/2007 | Omoto et al. | |
| 7,171,723 B2 | 2/2007 | Kobayashi et al. | |
| 7,193,384 B1 | 3/2007 | Norman et al. | |
| 7,228,202 B2 | 6/2007 | Carlson et al. | |
| 7,283,892 B1 | 10/2007 | Boillot et al. | |
| 7,363,108 B2 | 4/2008 | Noda et al. | |
| 7,424,611 B2 | 9/2008 | Hino et al. | |
| 8,020,245 B2 | 9/2011 | Whittaker | |
| D647,265 S | 10/2011 | Follows et al. | |
| 8,316,503 B2 | 11/2012 | Follows et al. | |
| 8,800,107 B2 * | 8/2014 | Blouin | A47L 9/0455 15/392 |
| 8,881,339 B2 | 11/2014 | Gilbert, Jr. et al. | |
| 8,910,342 B2 | 12/2014 | Gilbert, Jr. et al. | |
| 8,955,192 B2 | 2/2015 | Gilbert, Jr. et al. | |
| D728,877 S | 5/2015 | Therrien | |
| 9,173,534 B2 | 11/2015 | Ando et al. | |
| 9,220,386 B2 | 12/2015 | Gilbert, Jr. et al. | |
| 9,320,400 B2 | 4/2016 | Gilbert, Jr. et al. | |
| 9,326,654 B2 * | 5/2016 | Doughty | A47L 9/0477 |
| 9,351,619 B2 | 5/2016 | Bosses | |
| 9,480,374 B2 * | 11/2016 | Li | A47L 9/0455 |
| D774,263 S | 12/2016 | Reichel et al. | |
| 2002/0081937 A1 | 6/2002 | Yamada et al. | |
| 2002/0169521 A1 | 11/2002 | Goodman et al. | |
| 2004/0020000 A1 | 2/2004 | Jones | |
| 2004/0045125 A1 | 3/2004 | Park et al. | |
| 2004/0049877 A1 | 3/2004 | Jones et al. | |
| 2004/0074028 A1 | 4/2004 | Goff | |
| 2004/0098167 A1 | 5/2004 | Yi et al. | |
| 2004/0187249 A1 | 9/2004 | Jones et al. | |
| 2004/0204792 A1 | 10/2004 | Taylor et al. | |
| 2004/0211444 A1 | 10/2004 | Taylor et al. | |
| 2004/0216265 A1 | 11/2004 | Peacock et al. | |
| 2004/0236468 A1 | 11/2004 | Taylor et al. | |
| 2004/0244138 A1 | 12/2004 | Taylor et al. | |
| 2005/0181968 A1 | 8/2005 | Policicchio et al. | |
| 2005/0183229 A1 | 8/2005 | Uehigashi | |
| 2005/0204717 A1 | 9/2005 | Colens | |
| 2007/0095367 A1 | 5/2007 | Wang et al. | |
| 2008/0052846 A1 | 3/2008 | Kapoor et al. | |
| 2008/0244852 A1 * | 10/2008 | Alton | A46B 13/001 15/179 |
| 2010/0037418 A1 | 2/2010 | Hussey et al. | |
| 2010/0287717 A1 | 11/2010 | Jang et al. | |
| 2010/0306958 A1 * | 12/2010 | Follows | A47L 9/0477 15/383 |
| 2014/0157542 A1 | 6/2014 | Morphey et al. | |
| 2014/0259475 A1 | 9/2014 | Doughty | |
| 2015/0342430 A1 * | 12/2015 | Kasper | A47L 9/0477 15/182 |
| 2016/0166127 A1 | 6/2016 | Lewis | |
| 2017/0150859 A1 | 6/2017 | Muir | |
| 2018/0168417 A1 * | 6/2018 | Goddard | A47L 11/4041 |

FOREIGN PATENT DOCUMENTS

| | | |
|---|---|---|
| EP | 0 051 996 | 5/1982 |
| EP | 1 228 734 | 8/2002 |
| GB | 157616 | 1/1921 |
| GB | 2262433 | 6/1993 |
| GB | 2344863 | 6/2000 |
| GB | 2446817 | 8/2008 |
| JP | 55104929 | 4/1982 |
| JP | 05049566 | 3/1993 |
| JP | 06007271 | 1/1994 |
| JP | 06014853 | 1/1994 |
| JP | 08173355 | 7/1996 |
| JP | 1126084 | 8/1999 |
| JP | 2000354567 | 12/2000 |
| JP | 2002112931 | 4/2002 |
| JP | 2002345698 | 12/2002 |

(56) References Cited

FOREIGN PATENT DOCUMENTS

| | | |
|---|---|---|
| JP | 2003000484 | 1/2003 |
| JP | 2003290092 | 10/2003 |
| JP | 2003290093 | 10/2003 |
| JP | 2004121795 | 4/2004 |
| JP | 2006034996 | 2/2006 |
| JP | 2006149455 | 6/2006 |
| JP | 2006325761 | 12/2006 |
| JP | 05146382 | 1/2008 |
| JP | 2008000382 | 1/2008 |
| JP | 2009017902 | 1/2009 |
| JP | 2011016001 | 1/2011 |
| JP | 2011115541 | 6/2011 |
| KR | 20110125942 | 11/2011 |
| WO | WO 1995/016382 | 6/1995 |
| WO | WO 2005/107563 | 11/2005 |
| WO | WO 2007/065033 | 6/2007 |
| WO | WO 2009/117383 | 9/2009 |
| WO | WO 2009/149722 | 12/2009 |
| WO | WO 2011/121816 | 10/2011 |

* cited by examiner

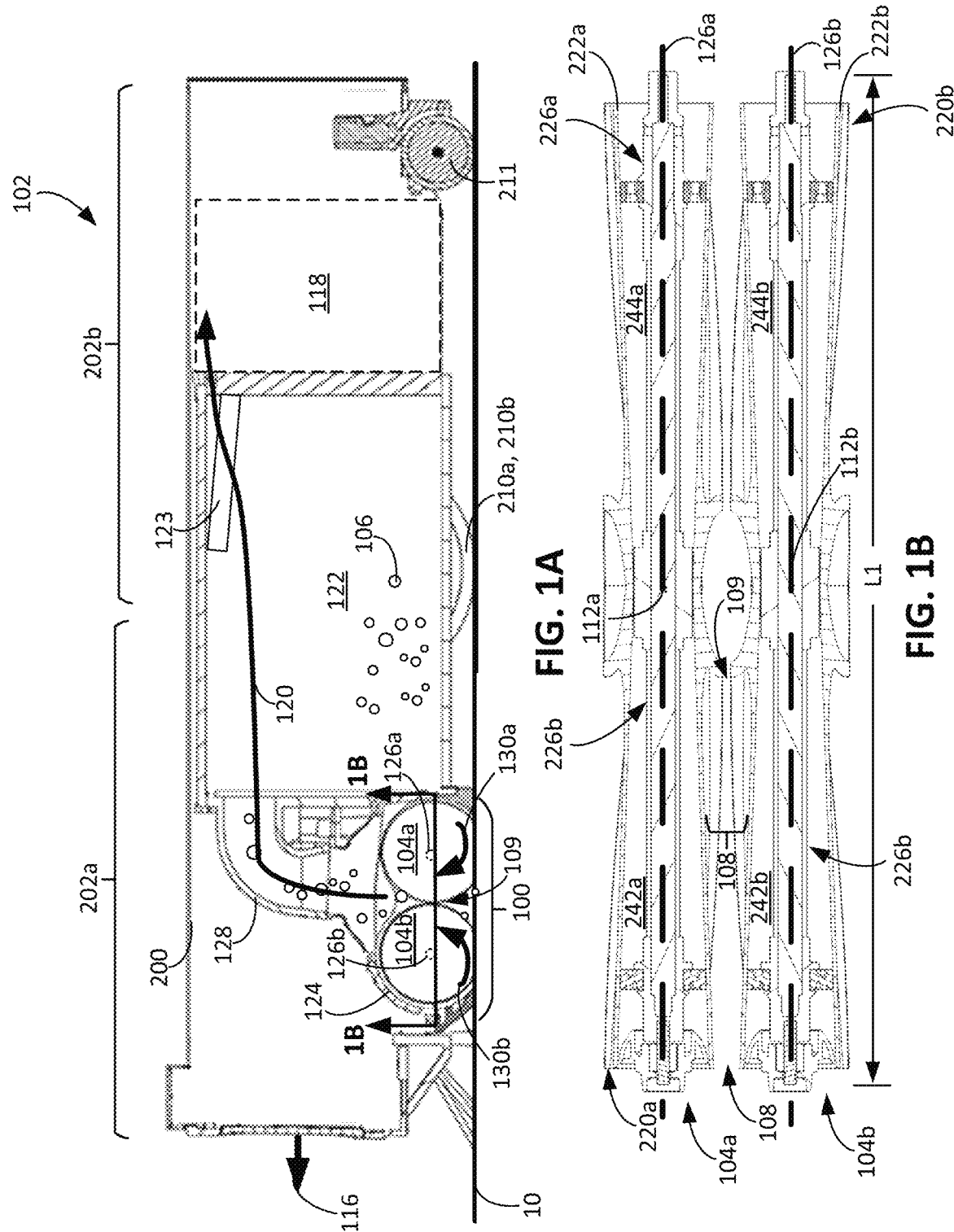

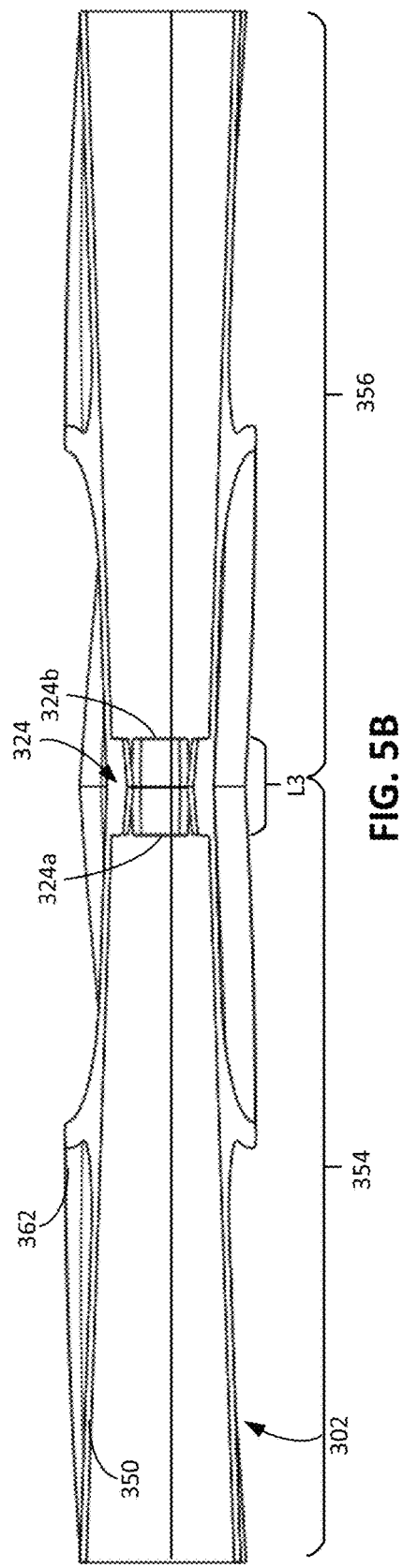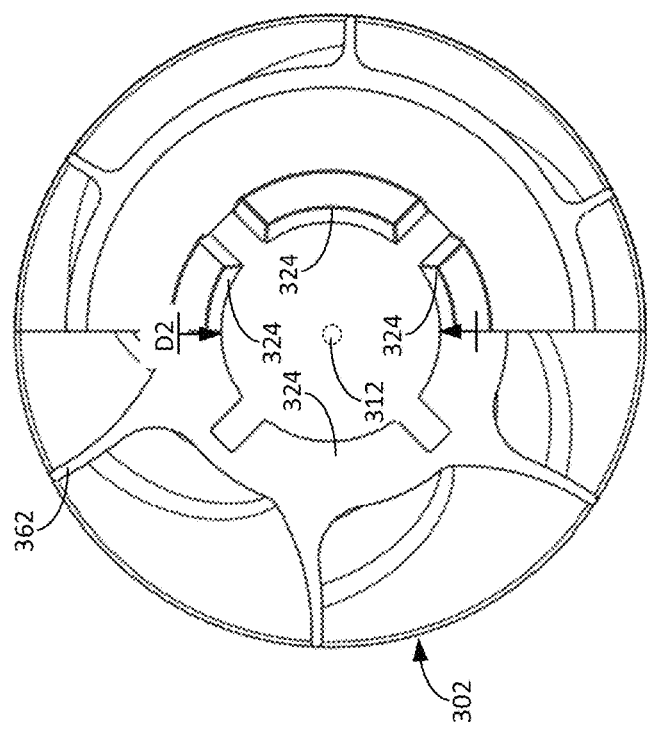
FIG. 5B
FIG. 5C

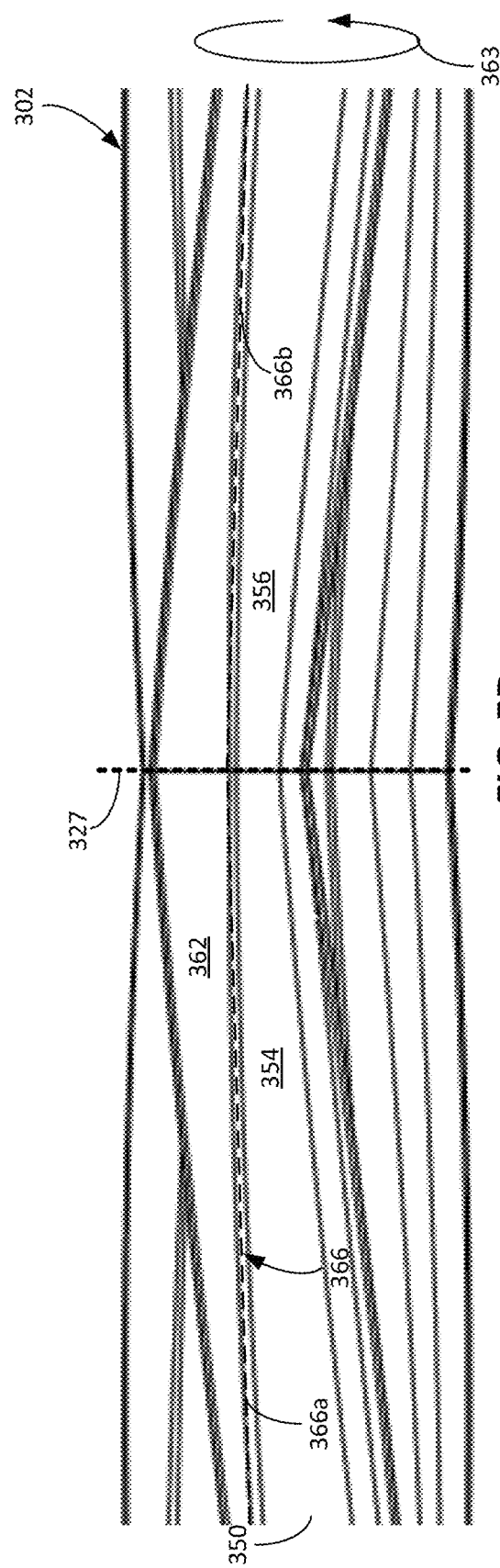

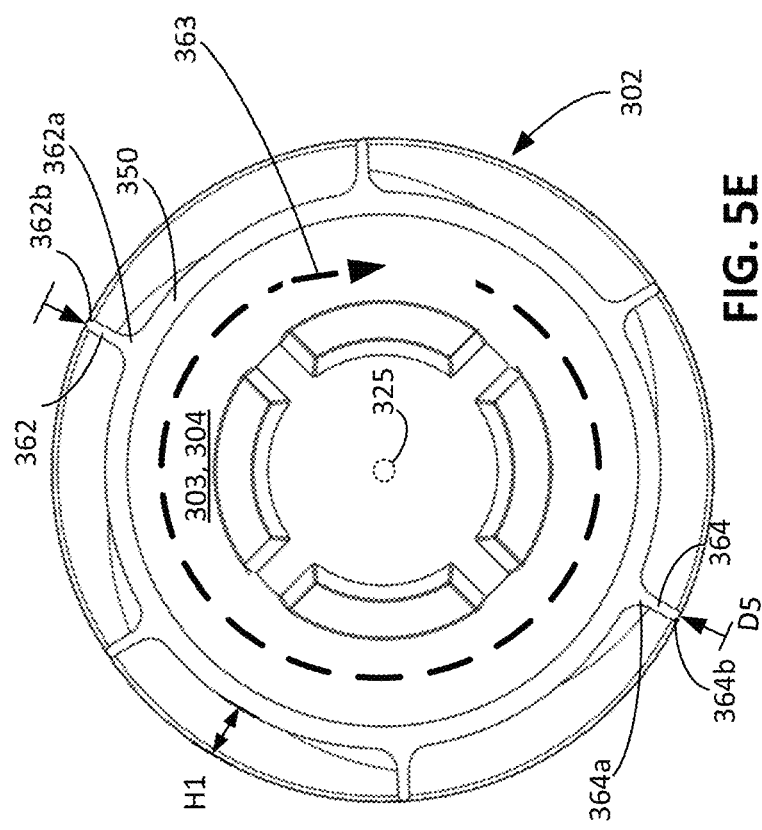

CLEANING ROLLER FOR CLEANING ROBOTS

TECHNICAL FIELD

This specification relates to cleaning rollers, in particular, for cleaning robots.

BACKGROUND

An autonomous cleaning robot can navigate across a floor surface and avoid obstacles while vacuuming the floor surface and operating rotatable members carried by the robot to ingest debris from the floor surface. As the robot moves across the floor surface, the robot can rotate the rotatable members, which engage the debris and guide the debris toward a vacuum airflow generated by the robot. The rotatable members and the vacuum airflow can thereby cooperate to allow the robot to ingest debris.

SUMMARY

In one aspect, a cleaning roller mountable to a cleaning robot is featured. The cleaning roller includes a sheath including a shell, and a core extending from a first end portion to a second end portion along an axis of rotation of the roller. An outer diameter of the shell tapers from a first end portion of the sheath and a second end portion of the sheath toward a center of the roller. The first and second end portions of the core are mountable to the robot for rotating about the axis of rotation. The core includes a central portion interlocked with the sheath to rotationally couple the core to the sheath and inhibit relative translation of the sheath and the core along the axis of rotation. An inner surface of the sheath and an outer surface of the core define an air gap therebetween, the air gap extending from the central portion of the core longitudinally along the axis of rotation toward the first end portion or the second end portion.

In another aspect, an autonomous cleaning robot includes a body, a drive operable to move the body across a floor surface, and a cleaning assembly including a cleaning roller rotatable about an axis of rotation of the roller. The cleaning roller includes a sheath including a shell, and a core extending from a first end portion to a second end portion along the axis of rotation of the roller. An outer diameter of the shell tapers from a first end portion of the sheath and a second end portion of the sheath toward a center of the roller. The core includes a central portion interlocked with the sheath to rotationally couple the core to the sheath and inhibit relative translation of the sheath and the core along the axis of rotation. An inner surface of the sheath and an outer surface of the core define an air gap therebetween, the air gap extending from the central portion of the core longitudinally along the axis of rotation toward the first end portion or the second end portion.

In some implementations, the cleaning roller further includes a first circular member proximate the first end portion of the core and extending radially outward from the outer surface of the core toward the inner surface of the sheath, and a second circular member proximate the second end portion of the core and extending radially outward from the outer surface of the core toward the inner surface of the sheath. The core can extend along the axis of rotation through centers of the first and second circular members.

In some cases, the first and second circular members are configured to contact the inner surface of the sheath to radially support the sheath. In some cases, thicknesses of the first and second circular members are between 2.5 and 7.5 mm. In some cases, a distance between the first circular member and the center of the roller is between 60 and 100 mm, and a distance between the second circular member and the center of the roller is between 60 and 100 mm. In some cases, the first and second circular members each includes an outer ring, an inner ring coupled to the core, and a plurality of elongate members extending between the outer ring and the inner ring. In some cases, each of the plurality of elongate members extends outward at a non-zero angle relative to a radial axis.

In some cases, the core includes a first locking member abutting the first circular member in a first longitudinal direction and a second longitudinal direction to inhibit relative longitudinal translation of the core and the first circular member, and a second locking member abutting the second circular member in the first longitudinal direction and the second longitudinal direction to inhibit relative longitudinal translation of the core and the second circular member. In some cases, a surface of the first circular member proximate the inner surface of the sheath and a surface of the second circular member proximate the inner surface of the sheath are sloped toward the center of the roller. In some cases, a distance between the first circular member and the center of the roller is between 25% and 45% of a length of the roller and a distance between the second circular member and the center of the roller is between 25% and 45% of a length of the roller.

In some implementations, the central portion of the core includes one or more locking members extending radially outward from a shaft portion of the core. The sheath can include a locking member extending radially inward from the inner surface of the shell. The locking member of the sheath abuts the one or more locking members of the central portion of the core in a first longitudinal direction and a second longitudinal direction. In some cases, the one or more locking members includes a surface facing the second end portion of the core. The surface can form a non-perpendicular angle with the axis of rotation. In some cases, the one or more locking members of the sheath abut the one or more locking members of the central portion of the core in a direction of rotation of the roller.

In some implementations, the air gap has a length at least 25% of a length of the cleaning roller.

In some implementations, the sheath includes a vane extending radially outwardly from an outer surface of the shell and following a first path along the outer surface of the shell, and a plurality of nubs protruding radially outwardly from the outer surface of the shell and spaced apart from one another along the outer surface of the shell. Each of the nubs can follow a portion of a second path circumferentially offset along the outer surface of the shell from the first path. A first portion of the nubs can extend longitudinally from the first end portion of the sheath toward the center of the roller along 15% to 35% of a length of the roller, and a second portion of the nubs can extend longitudinally from the second end portion of the sheath toward the roller of the sheath along 15% to 35% of the length of the roller.

In some cases, a height of the vane relative to the axis of rotation is uniform across a length of the roller. Heights of the nubs can be uniform along the portion of the second path relative to the axis of rotation. The height of the vane can be 0.5 to 1.5 mm greater than the heights of the nubs.

In some implementations, the sheath includes a first vane extending radially outwardly from an outer surface of the shell and following a first path along the outer surface of the shell, a second vane extending radially outwardly from an outer surface of the shell and following a second path along the outer surface of the shell. The second path can be circumferentially offset along the outer surface of the shell from the first path. The sheath can further include a plurality of nubs protruding radially outwardly from the outer surface of the shell and spaced apart from one another along the outer surface of the shell. Each of the nubs can follow a portion of a third path circumferentially offset along the outer surface of the shell from the first path and the second path. The third path can be positioned along the outer surface of the shell between the first path and the second path.

Advantages of the foregoing may include, but are not limited to, those described below and herein elsewhere. With a roller sheath being interlocked with a roller core at a central portion of the core, torque applied to the core can be easily transferred to the sheath such that the sheath can rotate and draw debris into the robot in response to rotation of the core. This interlocking mechanism between the sheath and the core can use less material than rollers that have sheaths and cores interlocked across a large portion of the overall length of the roller, e.g., 50% or more of the overall length of the roller.

Furthermore, circular members that radially support the sheath can have a relatively small thickness compared to an overall length of the roller. The circular members can thus provide radial support to the sheath without contributing a significant amount of mass to the overall mass of the roller. Between locations at which the sheath is radially supported, the resilience of the sheath enables the sheath to deform radially inward in response to contact with debris and other objects and then resiliently return to an undeformed state when the debris or other objects are no longer contacting the sheath. As a result, the core does not need to support the sheath across an entire length of the sheath, thereby reducing the overall amount of material used for supporting the sheath. The decreased overall material used in the roller, e.g., through use of the interlocking mechanism and the circular members, can decrease vibrations induced by rotation of the roller and can decrease the risk of lateral deflection of the roller induced by centripetal forces on the roller. This can improve the stability of the roller during rotation of the roller while also decreasing the amount of noise generated upon impact of the roller with objects, e.g., debris or the floor surface.

The roller can further include features that make the roller more easily manufactured and assembled. For example, locking features such as the locking members provide coupling mechanisms between the components of the roller, e.g., the sheath, the core, and the circular members, without fasteners or adhesives. These locking features can further be poka-yoke, thereby reducing the risk that the roller is assembled or manufactured incorrectly.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 1A is a cross-sectional side view of a cleaning robot during a cleaning operation.

FIG. 1B is a cross-sectional bottom view of cleaning rollers of the robot taken along the section 1B-1B shown in FIG. 1A.

FIGS. 5A and 5B are partial cutaway and front cutaway views, respectively, of a sheath of cleaning roller of FIG. 3A.

FIG. 5C is a stitched image of a cross-sectional side view of the sheath of FIG. 5A along section 5C-5C and a side view of the sheath of FIG. 5A.

FIG. 5D is a front view of a portion of the sheath of FIG. 5A.

FIG. 5E is a side view of the sheath of FIG. 5A.

Like reference numbers and designations in the various drawings indicate like elements.

DETAILED DESCRIPTION

Figure 1C:
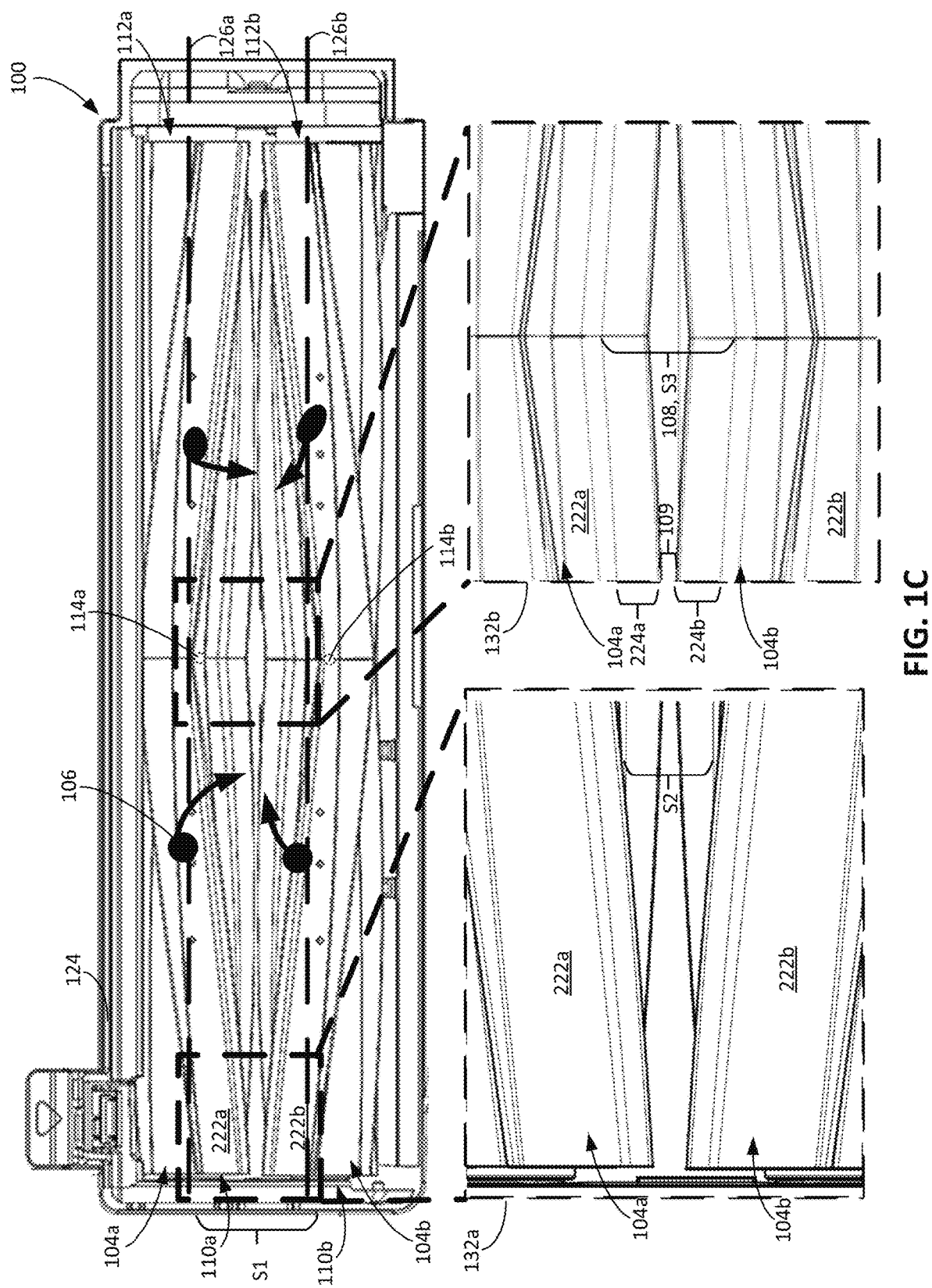
FIG. 1C is a bottom view of a cleaning head of the robot of FIG. 1A during the cleaning operation.

Referring to FIG. 1A, a cleaning head 100 for a cleaning robot 102 includes rotatable members, e.g., cleaning rollers 104a, 104b, that are positioned to engage debris 106 on a floor surface 10. The robot 102 moves about the floor surface 10 while rotating the rollers 104a, 104b and operating a vacuum assembly 118 to ingest the debris 106 from the floor surface 10. During the cleaning operation, the rollers 104a, 104b rotate to lift the debris 106 from the floor surface 10 into the robot 102 while the robot 102 moves about the floor surface 10. The rotation of the rollers 104a, 104b facilitates movement of the debris 106 toward an interior of the robot 102. Outer surfaces of the rollers 104a, 104b contact and engage the debris 106 and then direct the debris 106 toward an interior of the robot 102. The contact between the rollers 104a, 104b and the debris 106 further agitates the debris 106, enabling the debris 106 to be more easily suctioned into the robot 102.

As shown in FIGS. 1B and 1C, a separation 108 and an air opening 109 are defined between the roller 104a and the roller 104b. The separation 108 corresponds to a separation between shells 222a, 222b (shown in FIG. 1B) of the rollers 104a, 104b. The separation 108 varies along lengths of the rollers 104a, 104b and facilitates movement of the debris 106 caused by the rollers 104a, 104b upward toward the interior of the robot 102 so that the debris 106 can be ingested by the robot 102. Rather than being uniformly separated along the lengths of the rollers 104a, 104b, the shells 222a, 222b are separated by the separation 108 that varies in width along the lengths of the rollers 104a, 104b. The air opening 109 enables airflow generated by the vacuum assembly 118 to be generated at locations proximate the rollers 104a, 104b, e.g., below the rollers 104a, 104b proximate the floor surface 10 and along the outer surfaces of the rollers 104a, 104b. A width of the air opening 109 corresponds to the distance between outer diameters of the rollers 104a, 104b. The air opening 109 is sized to accommodate debris 106 moved by the rollers 104a, 104b as the rollers 104a, 104b rotate. The width of the air opening 109 varies as the rollers 104a, 104b rotate due to changes in geometry of the surface of the rollers 104a, 104b facing one another.

Referring to FIG. 1B, which shows a longitudinal cross-section of the rollers 104a, 104b, air gaps 242a, 242b, 244a, 244b span portions of interiors of the rollers 104a, 104b. The air gaps 242a, 242b, 244a, 244b span portions of the rollers 104a, 104b in which sheaths 220a, 220b of the rollers 104a, 104b do not transversally contact or radially contact support structures 226a, 226b. The support structures 226a, 226b are circumferentially surrounded by the sheaths 220a, 220b and are coaxially aligned with the longitudinal axes 126a, 126b of the rollers 104a, 104b. As the debris 106 is ingested by the roller 104a 104b, the air gaps 242a, 242b, 244a, 244b enable outer surfaces of the rollers 104a, 104b to inwardly deflect, e.g., to resiliently deflect toward longitudinal axes 126a, 126b of the rollers 104a, 104b. This enables larger pieces of the debris 106 to be more easily ingested. In addition, because of the air gaps 242a, 242b, 244a, 244b, the rollers 104a, 104b are formed of less material and have smaller masses as compared to solid rollers without air gaps in their interiors. By being formed of less material, the rollers 104a, 104b can be more easily manufactured and, in particular, can be manufactured with smaller amounts of runout, e.g., circular, semicircular, or arcuate geometry that is off-center relative to an axis of rotation of the rollers 104a, 104b due to an error during manufacturing. As a result, the rollers 104a, 104b are less prone to vibrating during rotation as compared to rollers that have greater amounts of runout. Furthermore, the smaller masses of the rollers 104a, 104b can reduce centripetal forces on the rollers 104a, 104b and thus decrease lateral deflections of the rollers 104a, 104b during rotation. The air gaps 242, 244 of the rollers 104a, 104b can therefore improve stability of and decrease noise generated by the rollers 104a, 104b during rotation.

Example Cleaning Robots

The robot 102 is an autonomous cleaning robot that autonomously traverses the floor surface 10 while ingesting the debris 106 from different parts of the floor surface 10. In the example depicted in FIGS. 1A and 2A, the robot 102 includes a body 200 movable across the floor surface 10. The body 200 includes, in some cases, multiple connected structures to which movable components of the robot 102 are mounted. For example, the connected structures forming the body 200 include an outer housing to cover internal components of the robot 102, a chassis to which drive wheels 210a, 210b and the rollers 104a, 104b are mounted, a bumper mounted to the outer housing, a lid for an internal cleaning bin of the robot 102, etc.

Figure 2A:
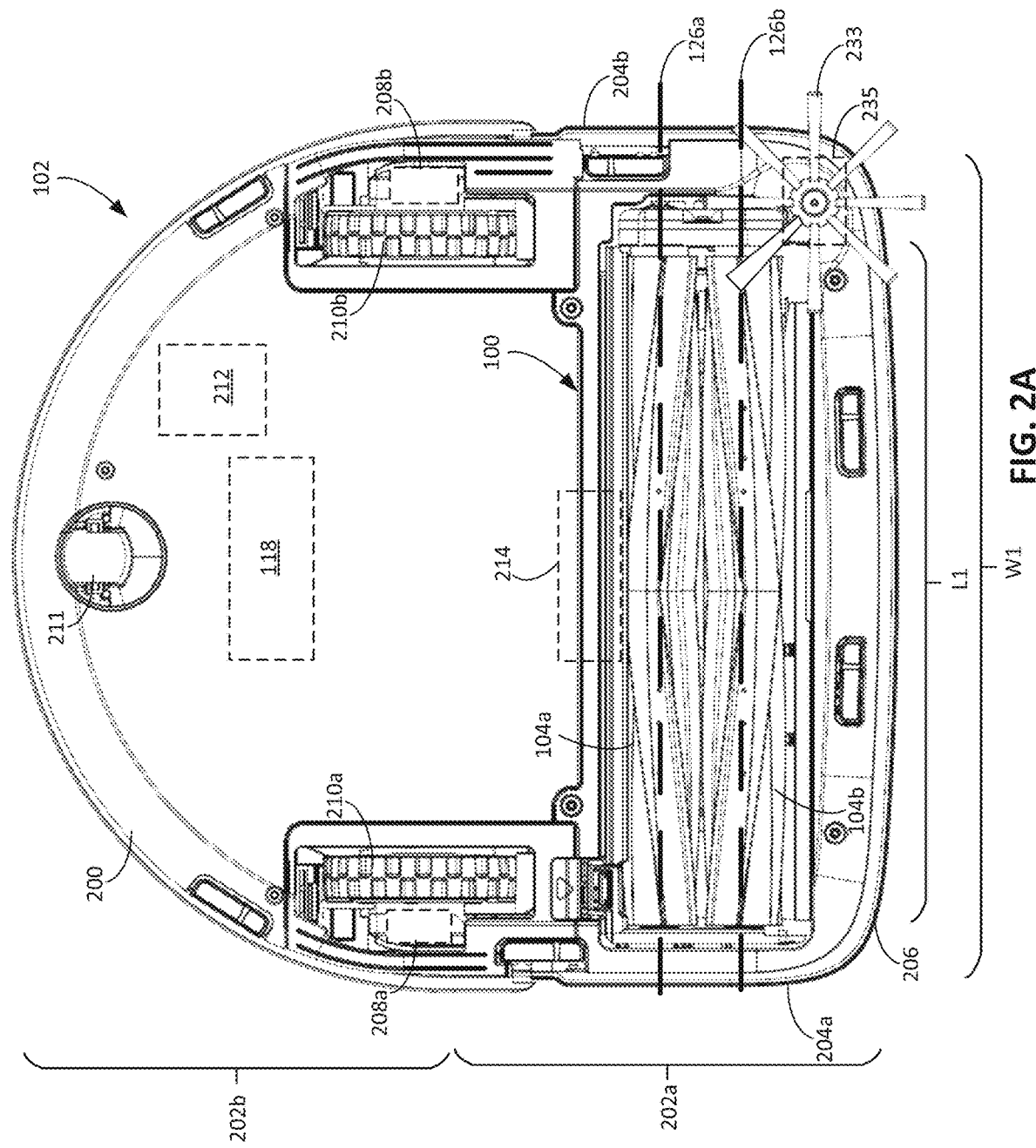
FIGS. 2A and 2B are a bottom view and a bottom perspective exploded view, respectively, of the robot of FIG. 1A.

The body 200 includes a front portion 202a that has a substantially rectangular shape and a rear portion 202b that has a substantially semicircular shape. The front portion 202a is, for example, a front one-third to front one-half of the robot 102, and the rear portion 202b is a rear one-half to two-thirds of the robot 102. As shown in FIG. 2A, the front portion 202a includes two lateral sides 204a, 204b that are substantially perpendicular to a front side 206 of the front portion 202a. In some implementations, a width W1 of the robot 102, e.g., a distance between the two lateral sides 204a, 204b, is between 20 cm and 60 cm, e.g., between 20 cm and 40 cm, 30 cm and 50 cm, 40 cm and 60 cm, etc.

The robot 102 includes a drive system including actuators 208a, 208b, e.g., motors, operable with drive wheels 210a, 210b. The actuators 208a, 208b are mounted in the body 200 and are operably connected to the drive wheels 210a, 210b, which are rotatably mounted to the body 200. The drive wheels 210a, 210b support the body 200 above the floor surface 10. The actuators 208a, 208b, when driven, rotate the drive wheels 210a, 210b to enable the robot 102 to autonomously move across the floor surface 10.

The robot 102 includes a controller 212 that operates the actuators 208a, 208b to autonomously navigate the robot 102 about the floor surface 10 during a cleaning operation. The actuators 208a, 208b are operable to drive the robot 102 in a forward drive direction 116 (shown in FIG. 1A) and to turn the robot 102. In some implementations, the robot 102 includes a caster wheel 211 that supports the body 200 above the floor surface 10. For example, the caster wheel 211 supports the rear portion 202b of the body 200 above the floor surface 10, and the drive wheels 210a, 210b support the front portion 202a of the body 200 above the floor surface 10.

As shown in FIGS. 1A and 2A, the vacuum assembly 118 is carried within the body 200 of the robot 102, e.g., in the rear portion 202b of the body 200. Referring to FIG. 2A specifically, the controller 212 operates the vacuum assembly 118 to generate an airflow 120 that flows through the air opening 109 near the rollers 104a, 104b, through the body 200, and out of the body 200. For example, the vacuum assembly 118 includes an impeller that generates the airflow 120 when rotated. The vacuum assembly 118 generates the air flow 120 as the rollers 104a, 104b rotate to ingest debris 106 into the robot 102. A cleaning bin 122 mounted in the body 200 is configured to store the debris 106 ingested by the robot 102. A filter 123 in the body 200 separates the debris 106 from the airflow 120 before the airflow 120 enters the vacuum assembly 118 and is exhausted out of the body 200. In this regard, the debris 106 is captured in both the cleaning bin 122 and the filter 123 before the airflow 120 is exhausted from the body 200.

As shown in FIG. 2A, the cleaning head 100 and the rollers 104a, 104b are positioned in the front portion 202a of the body 200 between the lateral sides 204a, 204b. The rollers 104a, 104b are operably connected to an actuation mechanism of the robot 102. In particular, the rollers 104a, 104b are operably connected to an actuation mechanism including a drive mechanism connected to an actuator 214 of the robot 102 such that torque provided by the actuator 214 can be delivered to drive the rollers 104a, 104b. The cleaning head 100 and the rollers 104a, 104b are positioned forward of the cleaning bin 122, which is positioned forward of the vacuum assembly 118. In the example of the robot 102 described with respect to FIGS. 2A, 2B, the substantially rectangular shape of the front portion 202a of the body 200 enables the rollers 104a, 104b to be longer than cleaning rollers for cleaning robots with, for example, a circularly shaped body.

The rollers 104a, 104b are mounted to a housing 124 (also shown in FIGS. 1A and 1C) of the cleaning head 100 and mounted, e.g., indirectly or directly, to the body 200 of the robot 102. In particular, the rollers 104a, 104b are mounted to an underside of the front portion 202a of the body 200 so that the rollers 104a, 104b engage debris 106 on the floor surface 10 during the cleaning operation when the underside of the front portion 202a faces the floor surface 10. In some implementations, the housing 124 of the cleaning head 100 is mounted to the body 200 of the robot 102. In this regard, the rollers 104a, 104b are also mounted to the body 200 of the robot 102, e.g., indirectly mounted to the body 200 through the housing 124. Alternatively or additionally, the cleaning head 100 is a removable assembly of the robot 102 in which the housing 124 with the rollers 104a, 104b mounted therein is removably mounted to the body 200 of the robot 102. The housing 124 and the rollers 104a, 104b are removable from the body 200 as a unit so that the cleaning head 100 is easily interchangeable with a replacement cleaning head.

In some implementations, rather than being removably mounted to the body 200, the housing 124 of the cleaning head 100 is not a component separate from the body 200, but rather, corresponds to an integral portion of the body 200 of the robot 102. The rollers 104a, 104b are mounted to the body 200 of the robot 102, e.g., directly mounted to the integral portion of the body 200. The rollers 104a, 104b are each independently removable from the housing 124 of the cleaning head 100 and/or from the body 200 of the robot 102 so that the rollers 104a, 104b can be easily cleaned or be replaced with replacement rollers. As described herein, the rollers 104a, 104b can include collection wells for filament debris that can be easily accessed and cleaned by a user when the rollers 104a, 104b are dismounted from the housing 124.

The rollers 104a, 104b are rotatable relative to the housing 124 of the cleaning head 100 and relative to the body 200 of the robot 102. As shown in FIGS. 1A, 1C, and 2A, the rollers 104a, 104b are rotatable about longitudinal axes 126a, 126b parallel to the floor surface 10. The axes 126a, 126b are parallel to one another and correspond to longitudinal axes of the rollers 104a, 104b, respectively. In some cases, the longitudinal axes 126a, 126b are perpendicular to the forward drive direction 116 of the robot 102. Referring to FIGS. 1B and 1C, centers 114a, 114b of the rollers 104a, 104b are positioned along the longitudinal axes 126a, 126b, respectively, and correspond to midpoints of lengths of the rollers 104a, 104b. The centers 114a, 114b, in this regard, are positioned along the axes of rotation of the rollers 104a, 104b. A length L1 (shown in FIG. 1B) of one or both of the rollers 104a, 104b is between, for example, 10 cm and 50 cm, e.g., between 10 cm and 30 cm, 20 cm and 40 cm, 30 cm and 50 cm, 20 cm and 30 cm, 22 cm and 26 cm, 23 cm and 25 cm, or about 24 cm. The length L1 is, for example, between 70% and 90% of an overall width W1 of the robot 102, e.g., between 70% and 80%, 75% and 85%, and 80% and 90%, etc., of the overall width W1 of the robot 102.

Figure 2B:
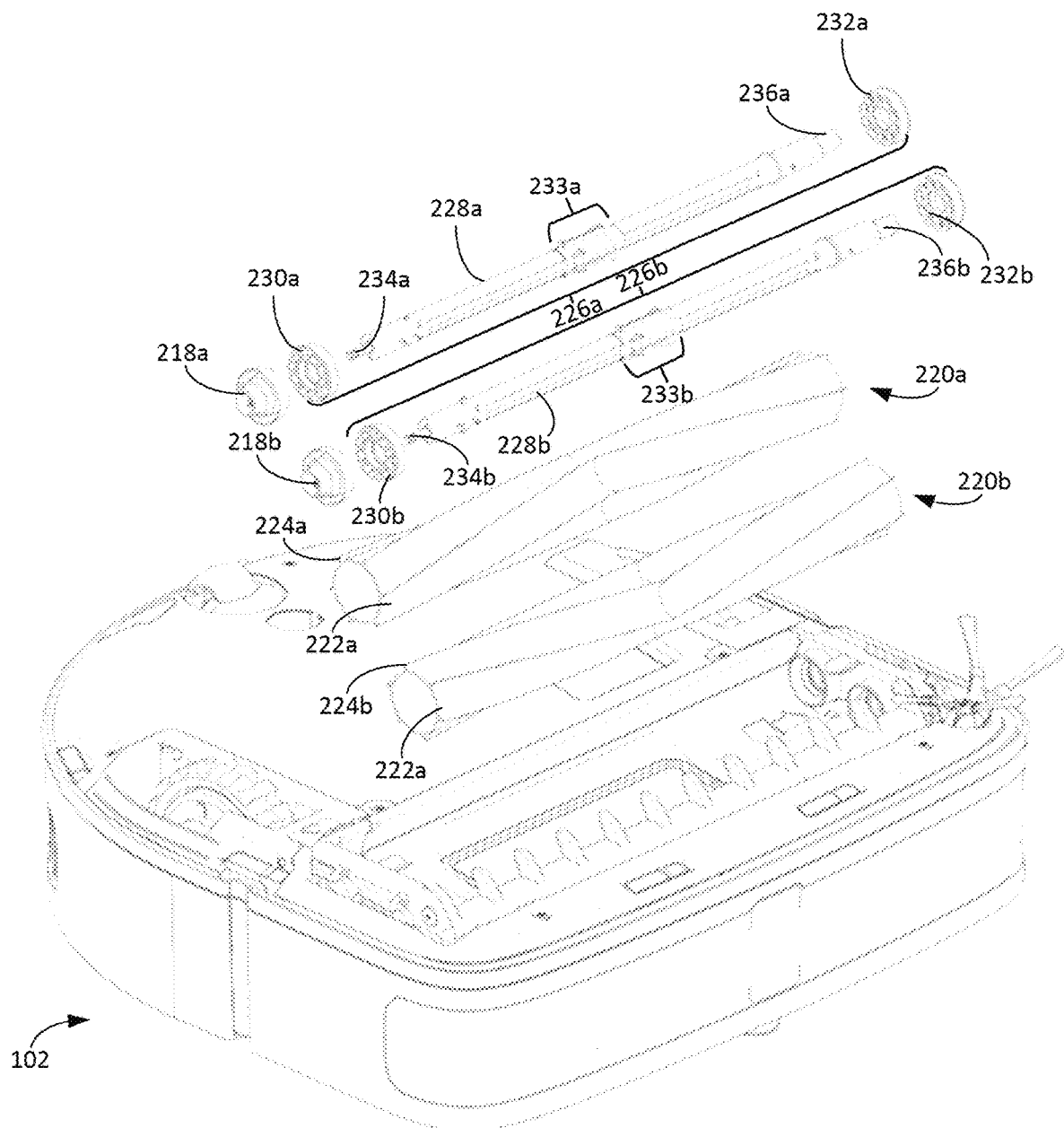

Referring to the exploded view of the cleaning head 100 shown in FIG. 2B, each of the rollers 104a, 104b includes the sheath 220a, 220b and the support structure 226a, 226b. The sheaths 220a, 220b each includes a shell 222a, 222b and vanes 224a, 224b (also shown in FIG. 1C). The support structures 226a, 226b each includes a core 228a, 228b, a first support member 230a, 230b, and a second support member 232a, 232b.

In some implementations, the sheath 220a, 220b is a single molded piece formed from one or more elastomeric materials. For example, the rollers 104a, 104b are elastomeric rollers featuring a pattern of chevron-shaped vanes 224a, 224b distributed along an exterior surface of the rollers 104a, 104b. The vanes 224a, 224b of at least one of the rollers 104a, 104b, e.g., the roller 104a, make contact with the floor surface 10 along the length of the rollers 104a, 104b and experience a consistently applied friction force during rotation that is not present with brushes having pliable bristles. The high surface friction of the sheath 220a, 220b enables the sheath 220a, 220b to engage the debris 106 and guide the debris 106 toward the interior of the robot 102, e.g., toward an air conduit 128 (shown in FIG. 1A) within the robot 102.

Furthermore, like cleaning rollers having distinct bristles extending radially from a rod member, the rollers 104a, 104b have the vanes 224a, 224b that extend radially outward. The vanes 224a, 224b, however, also extend continuously along the outer surface of the rollers 104a, 104b in longitudinal directions. The vanes 224a, 224b extend along circumferential directions along the outer surface of the rollers 104a, 104b, thereby defining V-shaped paths along the outer surface of the rollers 104a, 104b as described herein. Other suitable configurations, however, are also contemplated. For example, in some implementations, at least one of the rear and front rollers 104a, 104b may include bristles and/or elongated pliable flaps for agitating the floor surface in addition or as an alternative to the vanes 224a, 224b.

For each of the rollers 104a, 104b, the shell 222a, 222b and its corresponding vanes 224a, 224b are part of the single molded piece. The shell 222a, 222b is radially supported by the support structure 226a, 226b at multiple discrete locations along the length of the roller 104a, 104b and is unsupported between the multiple discrete locations. For example, as described herein, the shell 222a, 222b is supported at a central portion 233a, 233b of the core 228a, 228b and by the first support members 230a, 230b and the second support members 232a, 232b. The first support members 230a, 230b and the second support members 232a, 232b are members having circular outer perimeters that contact encircling segments of an inner surface of the sheath 220a, 220b. The support members 230a, 230b, 232a, 232b thereby radially or transversely support the sheath 220a, e.g., inhibit deflection of the sheath 220a toward the longitudinal axis 126a, 126b (shown in FIGS. 1B and 1C) in response to forces transverse to the longitudinal axis 126a, 126b. Where supported by the support members 230a, 230b, 232a, 232b or the central portion 233a, 233b of the core 228a, 228b, the sheath 220a, 220b is inhibited from deflecting radially inward, e.g., in response to contact with objects such as the floor surface 10 or debris collected from the floor surface 10. Furthermore, the support members 230a, 230b, 232a, 232b and the central portion 233a, 233b of the core 228a, 228b maintain outer circular shapes of the shell 222a, 222b.

Between each support member 230a, 232a, 230b, 232b and the central portion 233a, 233b of the core 228a, 228b, the sheath 220a, 220b is unsupported. For example, the support structure 226a, 226b does not contact the sheath 220a, 220b between the support members 230a, 232a, 230b, 232b and the central portion 233a, 233b of the core 228a, 228b. As described herein, the air gaps 242a, 242b, 244a, 244b span these unsupported portions and provide space for the sheath 220a, 220b to deflect radially inwardly, e.g., to deflect toward the longitudinal axis 126a, 126b.

The rollers 104a, 104b further include rod members 234a, 234b rotatably coupled to mounting devices 218a, 218b and rotationally coupled to the support structures 226a, 226b. The mounting devices 218a, 218b are mounted to the robot body 200, the cleaning head housing 124, or both so that the mounting devices 218a, 218b are rotationally fixed to the robot body 200, the cleaning head housing 124, or both. In this regard, the rod members 234a, 234b and the core 228a, 228b rotate relative to the mounting devices 218a, 218b as the rollers 104a, 104b are driven to rotate.

The rod members 234a, 234b are insert-molded components separate from the support structures 226a, 226b. For example, the rod members 234a, 234b are formed from metal and are rotatably coupled to the mounting devices 218a, 218b, which in turn are rotationally fixed to the body 200 of the robot 102 and the housing 124 of the cleaning head 100. Alternatively, the rod members 234a, 234b are integrally formed with the support structures 226a, 226b.

The rollers 104a, 104b further include elongate portions 236a, 236b operably connected to an actuator 214 (shown schematically in FIG. 2A) of the robot 102 when the rollers 104a, 104b are mounted to the body 200 of the robot 102 or the housing 124 of the cleaning head 100. The elongate portions 236a, 236b are rotationally fixed to engagement portions (not shown) of the actuation system of the robot 102, thereby rotationally coupling the rollers 104a, 104b to the actuator 214. The elongate portions 236a, 236b also rotatably mount the rollers 104a, 104b to the body of the robot 102 and the housing 124 of the cleaning head 100 such that the rollers 104a, 104b rotate relative to the body 200 and the housing 124 during the cleaning operation.

As shown in FIG. 1C, the roller 104a and the roller 104b are spaced from another such that the longitudinal axis 126a of the roller 104a and the longitudinal axis 126b of the roller 104b define a spacing S1. The spacing S1 is, for example, between 2 and 6 cm, e.g., between 2 and 4 cm, 4 and 6 cm, etc.

The roller 104a and the roller 104b are mounted such that the shell 222a of the roller 104a and the shell 222b of the roller 104b define the separation 108, and the vanes 224a, 224b define the air opening 109. The separation 108 and the air opening 109 both extend from a first outer end portion 110a of the roller 104a to a second outer end portion 112a of the roller 104a, or from a first outer end portion 110b of the roller 104b to a second outer end portion 112b of the roller 104b. As described herein, the separation 108 corresponds to a distance between the rollers 104a, 104b absent vanes 224a, 224b (and absent nubs as present in some implementations described herein) on the rollers 104a, 104b, while the air opening 109 has a width corresponding to the distance between the rollers 104a, 104b including the vanes 224a, 224b on the rollers 104a, 104b. While the air opening 109 can vary in width during rotation of the rollers 104a, 104b, the separation 108 has a constant width during rotation of the rollers 104a, 104b.

The separation 108 decreases in width in directions toward the end portions 110a, 112a of the roller 104a. Such a configuration of the separation 108 can improve debris pickup capabilities of the rollers 104a, 104b, e.g., the rear roller 104a and the front roller 104b while reducing likelihood that filament debris picked up by the rollers 104a, 104b impedes operations of the rollers 104a, 104b. The separation 108 is between the shell 222a of the rear roller 104a and the shell 222b of the front roller 104b and extends longitudinally along the shells 222a, 222b. In particular, the outer surface of the shell 222b of the front roller 104b and the outer surface of the shell 222a of the rear roller 104a are separated by the separation 108, which varies in width along the longitudinal axes 126a, 126b of the rollers 104a, 104b. The separation 108 tapers toward the center 114a of the roller 104a, e.g., towards a plane passing through centers of the both of the rollers 104a, 104b and perpendicular to the longitudinal axes 126a, 126b. The separation 108 increases in size toward the center 114a of the length L1 of the roller 104a.

The separation 108 is measured as a width between the outer surface of the shell 222a of the rear roller 104a and the outer surface of the shell 222b of the front roller 104b. In some cases, the width of the separation 108 is measured as the closest distance between the shell 222a and the shell 222b at various points along the longitudinal axis 126a and along a plane extending through both of the longitudinal axes 126a, 126b. In this regard, the width varies such that the distance S3 between the rollers 104a, 104b at their centers is greater than the distance S2 at their ends.

Referring to inset 132a in FIG. 1C, a length S2 of the separation 108 proximate the first end portion 110a of the roller 104a is between 2 and 10 mm, e.g., between 2 mm and 6 mm, 4 mm and 8 mm, 6 mm and 10 mm, etc. The length S2 of the separation 108, for example, corresponds to a minimum length of the separation 108 along the length L1 of the roller 104a. Referring to inset 132b in FIG. 1A, a length S3 of the separation 108 proximate the center 114a of the roller 104a is between, for example, 5 mm and 30 mm, e.g., between 5 mm and 20 mm, 10 mm and 25 mm, or 15 mm and 30 mm. The length S3 is, for example, 3 to 15 times greater than the length S2, e.g., 3 to 5 times, 5 to 10 times, or 10 to 15 times greater than the length S2. The length S3 of the separation 108, for example, corresponds to a maximum length of the separation 108 along the length L1 of the roller 104a. In some cases, the separation 108 linearly increases from the center 114a of the roller 104a toward the end portions 110a, 110b.

The air opening 109 between the rollers 104a, 104b is defined as an opening having a width corresponding to the distance between free tips of the vanes 224a, 224b (shown in the inset 132b of FIG. 1C) on opposing rollers 104a, 104b. In some examples, the distance varies depending on how the vanes 224a, 224b align during rotation. The air opening 109 between the sheaths 220a, 220b of the rollers 104a, 104b varies along the longitudinal axes 126a, 126b of the rollers 104a, 104b. In particular, the width of the air opening 109 varies in size depending on relative positions of the vanes 224a, 224b of the rollers 104a, 104b. The width of the air opening 109 is defined by the distance between the outer circumferences of the sheath 220a, 220b, e.g., defined by the vanes 224a, 224b, when the vanes 224a, 224b face one another during rotation of the rollers 104a, 104b. The width of the air opening 109 is defined by the distance between the outer circumferences of the shells 222a, 222b when the vanes 224a, 224b of both rollers 104a, 104b do not face the other roller. In this regard, while the outer circumference of the rollers 104a, 104b is consistent along the lengths of the rollers 104a, 104b as described herein, the air opening 109 between the rollers 104a, 104b varies in width as the rollers 104a, 104b rotate. In particular, while the separation 108 has a constant length during rotation of the opposing rollers 104a, 104b, the distance defining the air opening 109 changes during the rotation of the rollers 104a, 104b due to relative motion of the vanes 224a, 224b of the rollers 104a, 104b. The air opening 109 varies in width from a minimum width of 1 mm to 10 mm when the vanes 224a, 224b face one another to a maximum width of 5 mm to 30 mm when the vanes 224a, 224b are not aligned. The maximum width corresponds to, for example, the length S3 of the separation 108 at the centers of the rollers 104a, 104b, and the minimum width corresponds to the length of this separation 108 minus the heights of the vanes 224a, 224b at the centers of the rollers 104a, 104b.

Referring to FIG. 2A, in some implementations, to sweep debris 106 toward the rollers 104a, 104b, the robot 102 includes a brush 233 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes 126a, 126b of the rollers 104a, 104b. The robot 102 includes an actuator 235 operably connected to the brush 233. The brush 233 extends beyond a perimeter of the body 200 such that the brush 233 is capable of engaging debris 106 on portions of the floor surface 10 that the rollers 104a, 104b typically cannot reach.

During the cleaning operation shown in FIG. 1A, as the controller 212 operates the actuators 208a, 208b to navigate the robot 102 across the floor surface 10, if the brush 233 is present, the controller 212 operates the actuator 235 to rotate the brush 233 about the non-horizontal axis to engage debris 106 that the rollers 104a, 104b cannot reach. In particular, the brush 233 is capable of engaging debris 106 near walls of the environment and brushing the debris 106 toward the rollers 104a, 104b. The brush 233 sweeps the debris 106 toward the rollers 104a, 104b so that the debris 106 can be ingested through the separation 108 between the rollers 104a, 104b.

The controller 212 operates the actuator 214 to rotate the rollers 104a, 104b about the axes 126a, 126b. The rollers 104a, 104b, when rotated, engage the debris 106 on the floor surface 10 and move the debris 106 toward the air conduit 128. As shown in FIG. 1A, the rollers 104a, 104b, for example, counter rotate relative to one another to cooperate in moving debris 106 through the separation 108 and toward the air conduit 128, e.g., the roller 104a rotates in a clockwise direction 130a while the roller 104b rotates in a counterclockwise direction 130b.

The controller 212 also operates the vacuum assembly 118 to generate the airflow 120. The vacuum assembly 118 is operated to generate the airflow 120 through the separation 108 such that the airflow 120 can move the debris 106 retrieved by the rollers 104a, 104b. The airflow 120 carries the debris 106 into the cleaning bin 122 that collects the debris 106 delivered by the airflow 120. In this regard, both the vacuum assembly 118 and the rollers 104a, 104b facilitate ingestion of the debris 106 from the floor surface 10. The air conduit 128 receives the airflow 120 containing the debris 106 and guides the airflow 120 into the cleaning bin 122. The debris 106 is deposited in the cleaning bin 122. During rotation of the rollers 104a, 104b, the rollers 104a, 104b apply a force to the floor surface 10 to agitate any debris on the floor surface 10. The agitation of the debris 106 can cause the debris 106 to be dislodged from the floor surface 10 so that the rollers 104a, 104b can more contact the debris 106 and so that the airflow 120 generated by the vacuum assembly 118 can more easily carry the debris 106 toward the interior of the robot 102. As described herein, the deflectability of the shells 222a, 222b of the rollers 104a, 104b enable the rollers 104a, 104b to deflect in response to larger pieces of debris, thereby enabling debris to be more easily ingested into the robot 102.

Example Cleaning Rollers

Figure 3A:
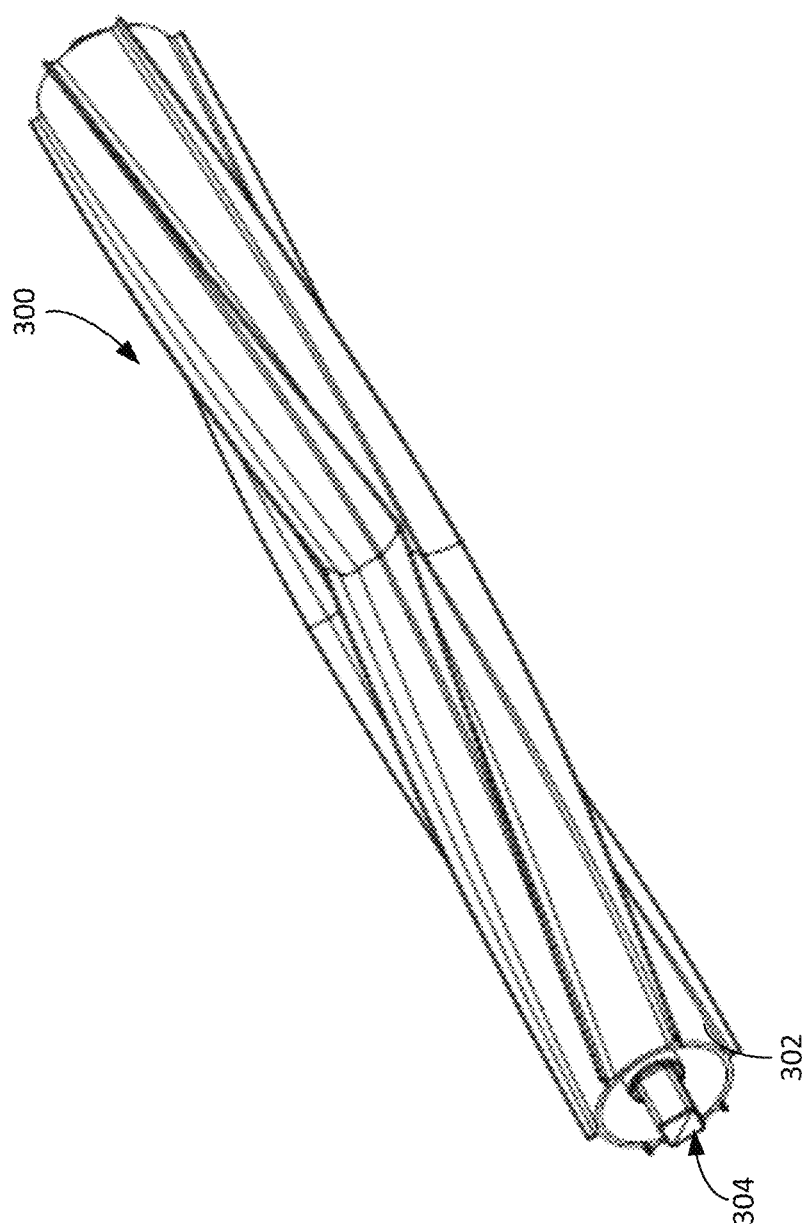
FIGS. 3A-3D are front perspective, front perspective exploded, front, and front cross-sectional views, respectively, of a cleaning roller.

The example of the rollers 104a, 104b described with respect to FIG. 2B can include additional configurations as described with respect to FIGS. 3A-10B. FIGS. 3A and 3B show an example of a roller 300 including an outer sheath 302 and an internal support structure 304. The roller 300, for example, corresponds to the rear roller 104a described with respect to FIGS. 1A, 1B, 2A, and 2B. The sheath 302 and the support structure 304 are similar to the sheath 220a and the support structure 226a of the rear roller 104a. As shown in FIG. 3C, an overall length of the roller 300 is similar to the overall length described with respect to the rollers 104a, 104b. For example, the roller 300 has a length L1. Like the roller 104a, the roller 300 can be mounted to the robot 102 and can be part of the cleaning head 100.

Figure 3B:
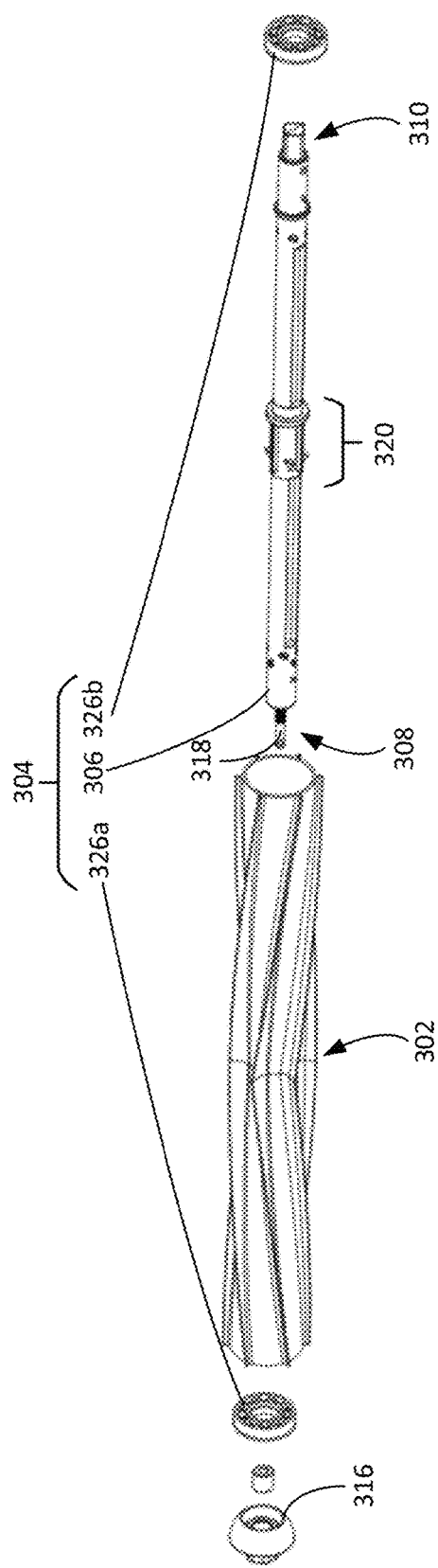
Figure 3C:
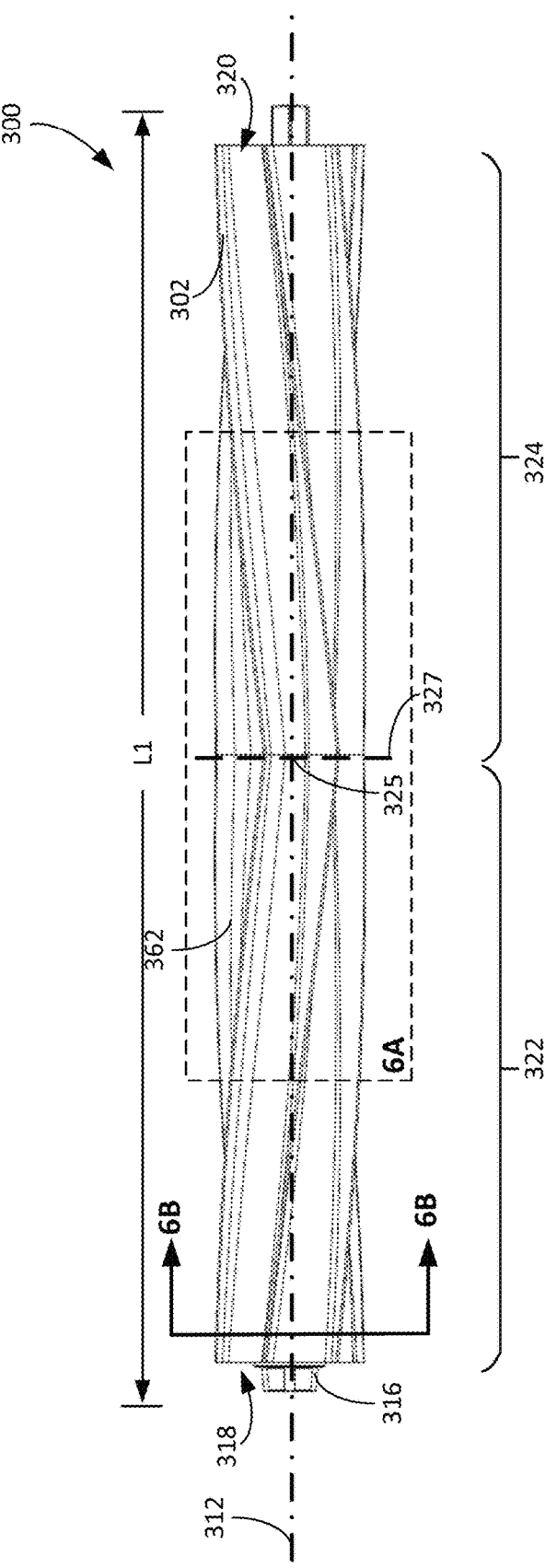
Figure 4A:
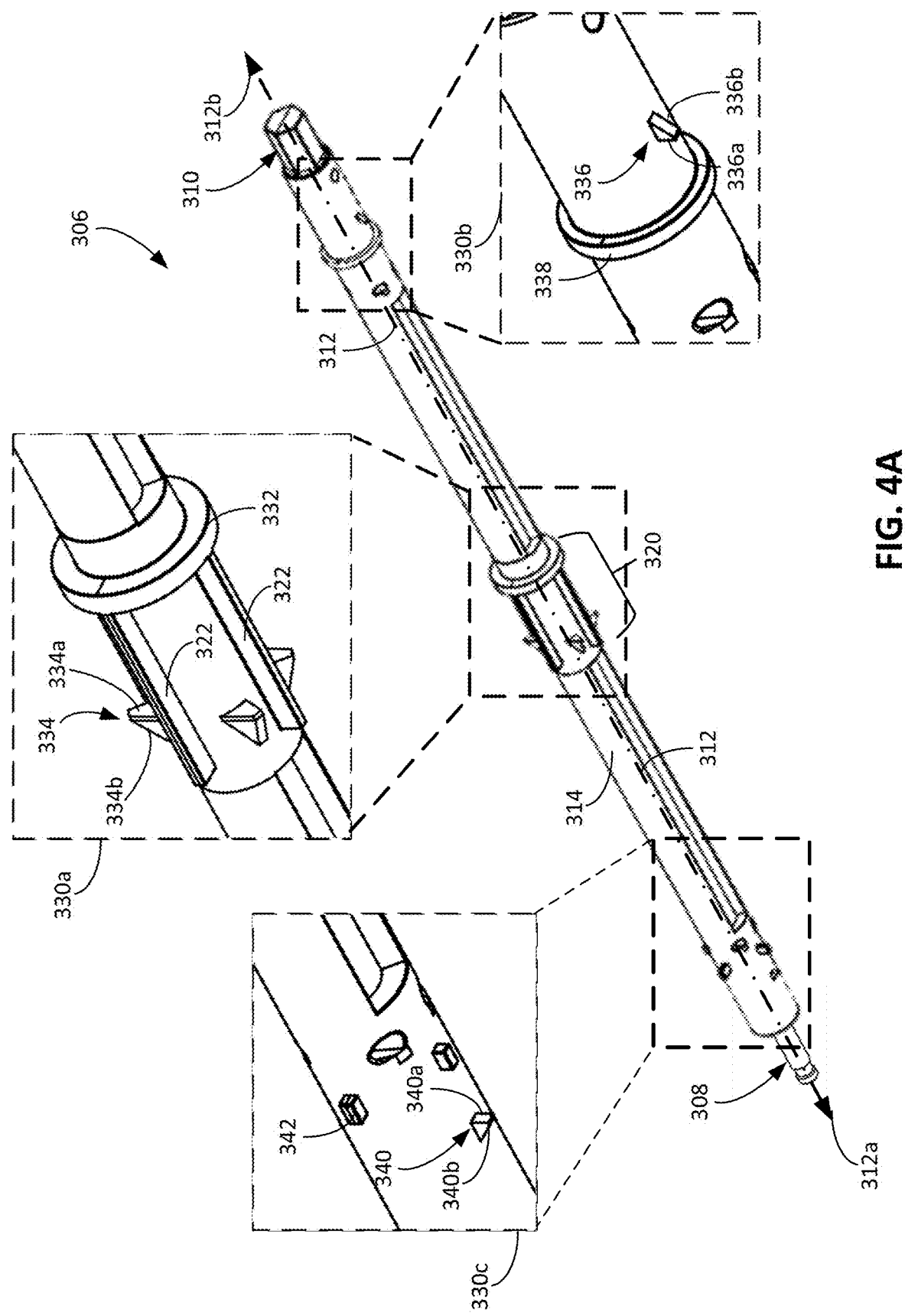
FIGS. 4A and 4B are front perspective and front views, respectively, of a core of the cleaning roller of FIG. 3A.
Figure 4B:
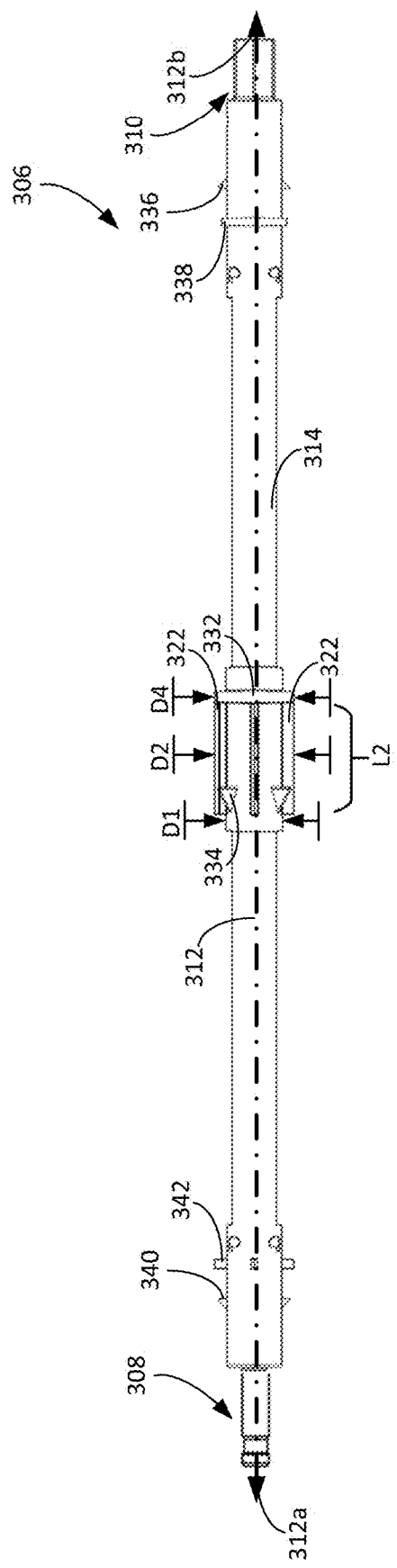

Referring to FIG. 3B, the support structure 304 includes an elongate core 306 having a first outer end portion 308 and a second outer end portion 310. Referring to FIGS. 4A and 4B, the core 306 extends from the first end portion 308 to the second end portion 310 along a longitudinal axis 312, e.g., the longitudinal axis 126a about which the roller 104a is rotated.

A shaft portion 314 of the core 306 extends from the first end portion 308 to the second end portion 310 and has an outer diameter D1 (shown in FIG. 4B) between 5 mm and 15 mm, e.g., between 5 and 10 mm, 7.5 mm and 12.5 mm, or 10 mm and 15 mm. At least a portion of an outer surface of the shaft portion 314 between the first end portion 308 and the second end portion 310 is a substantially cylindrical portion of the core 306. As described herein, features are arranged circumferentially about this portion of the outer surface of the shaft portion 314 to enable the core 306 to be interlocked with the sheath 302.

The first end portion 308 and the second end portion 310 of the core 306 are configured to be mounted to a cleaning robot, e.g., the robot 102, to enable the roller 300 to be rotated relative to the body 200 of the robot 102 about the longitudinal axis 312. The second end portion 310 is an elongate member engageable with an actuation system of the robot 102, e.g., so that the actuator 214 of the robot 102 can be used to drive the roller 300. The second end portion 310 has a non-circular cross-section to mate with an engagement portion of the drive mechanism driven by the actuator 214 of the robot 102. For example, the cross-section of the second end portion 310 has a prismatic shape having a square, rectangular, hexagonal, pentagonal, another polygonal cross-sectional shape, a Reuleaux polygonal cross-sectional shape, or other non-circular cross-sectional shape. The second end portion 310 is driven by the actuator of the robot 102 such that the core 306 rotates relative to the body 200 of the robot 102 and the housing 124 of the cleaning head 100. In particular, the core 306 rotationally couples the roller 300 to the actuator 214 of the robot 102. As described herein, the sheath 302 is rotationally coupled to the core 306 such that the sheath 302 is rotated relative to the floor surface 10 in response to rotation of the core 306. The sheath 302, which defines the outer surface of the roller 300, contacts debris on the floor surface 10 and rotates to cause the debris to be drawn into the robot 102.

Referring back to FIGS. 3B and 3C, a mounting device 316 (similar to the mounting device 218a) is on the first end portion 308 of the core 306. The mounting device 316 is rotatably coupled to the first end portion 308 of the core 306. For example, the first end portion 308 of the core 306 includes a rod member 318 (shown in FIG. 3B and, e.g., similar to the rod member 234a) that is rotatably coupled to the mounting device 316. The core 306 and the rod member 318 are affixed to one another, in some implementations, through an insert molding process during which the core 306 is bonded to the rod member 318. During rotation of the roller 300, the mounting device 316 is rotationally fixed to the body 200 of the robot 102 or the housing 124 of the cleaning head 100, and the rod member 318 rotates relative to the mounting device 316. The mounting device 316 functions as a bearing surface to enable the core 306 and the rod member 318 to rotate about its longitudinal axis 312 with relatively small frictional forces caused by contact between the rod member 318 and the mounting device 316.

Figure 3D:
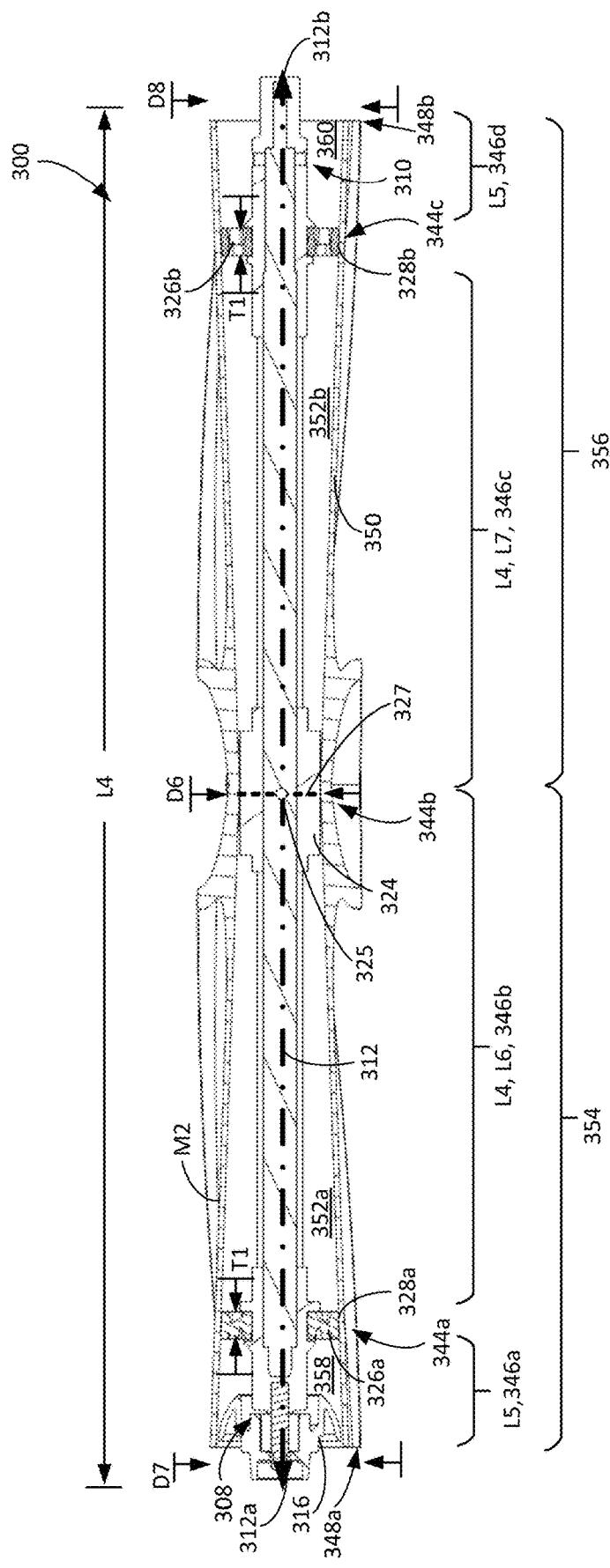

The core 306 is rotationally coupled to the sheath 302 so that rotation of the core 306 results in rotation of the sheath 302. Referring to FIGS. 3B and 3D, the core 306 is rotationally coupled to the sheath 302 at a central portion 320 of the core 306. The central portion 320 includes features that transfer torque from the core 306 to the sheath 302. The central portion 320 is interlocked with the sheath 302 to rotationally couple the core 306 to the sheath 302.

In some implementations, the central portion 320 includes one or more locking members arranged around the shaft portion 314 of the core 306. Referring to the inset 330a of FIG. 4A and to FIG. 4B, locking members 322 are protrusions extending radially outward from the shaft portion 314 of the core 306. Outer diameters D2 (shown in FIG. 4B) of the locking members 322 correspond to twice the distance between an outermost point of a locking member 322 and the longitudinal axis 312 and are between 10 and 20 mm, e.g., between 10 mm and 15 mm, 12.5 mm and 17.5 mm, between 15 mm and 20 mm. For example, the outer diameters D2 are 30% to 60% greater than the outer diameter D1 of the shaft portion 314, e.g., between 35% and 55% or 40% and 50% greater than the outer diameter D1. As shown in FIG. 4B, the locking members 322 extend longitudinally along the shaft portion 314, having a length L2 between 10 mm and 30 mm, e.g., between 10 mm and 20 mm, 15 mm and 25 mm, or 20 mm and 30 mm. For example, the length L2 is between 2.5% and 15% of the length L1 of the roller 300, e.g., between 2.5% and 7.5%, 5% and 10%, 7.5% and 12.5%, or 10% and 15% of the length L1 of the roller 300.

Figure 5A:
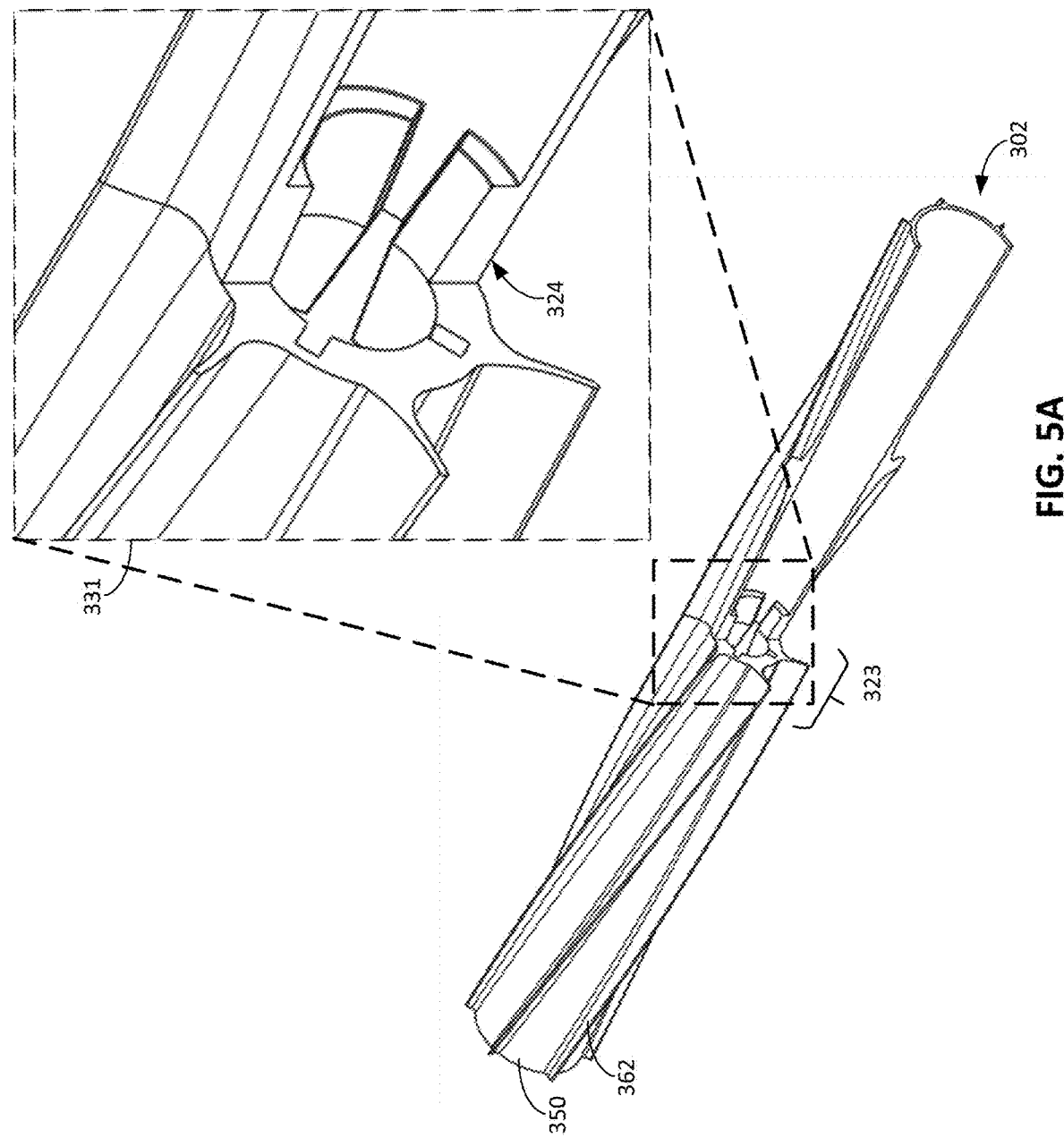

Referring to the inset 331 of FIG. 5A, the locking members 322 of the core 306 abut corresponding locking members 324 of the sheath 302. The locking members 324 of the sheath 302 extend radially inwardly from an inner surface of a shell 350 of the sheath 302 toward the core 306. A central portion 323 of the sheath 302 includes the locking members 324. These locking members 324 allow the central portion 323 of the sheath 302 to interlock with the central portion 320 of the core 306. The locking members 324 of the sheath 302 interlock with the locking members 322 of the core 306 such that the locking members 322 of the core 306 are positioned circumferentially between adjacent locking members 324 of the sheath 302. The locking members 322 and the locking members 324 abut one another in a circumferential direction, e.g., in a direction of rotation of the roller 300, thereby rotationally coupling the core 306 to the sheath 302. Similarly, the locking members 324 of the sheath 302 are positioned circumferentially between adjacent locking members 322 of the core 306. In this regard, the lengths L2 of the locking members 322 correspond to lengths of circumferential engagement between the locking members 322 and the locking members 324.

Referring to FIG. 5C, the locking members 324 of the sheath 302 have inner diameters D3, e.g., the distance between an innermost point of a locking member 324 and the longitudinal axis 312, shorter than the outer diameters D2 of the locking members 322 of the core 306. For example, the diameters D2 are between 5 mm and 15 mm, e.g., between 5 and 10 mm, 7.5 mm and 12.5 mm, or 10 mm and 15 mm. As shown in FIG. 5B, the locking members 324 extend longitudinally along the shell 350, having a length L3 between 5 mm and 25 mm, e.g., between 5 mm and 15 mm, 10 mm and 20 mm, or 15 mm and 25 mm. For example, the length L3 is between 2.5% and 15% of the length L1 of the roller 300, e.g., between 2.5% and 7.5%, 5% and 10%, 7.5% and 12.5%, or 10% and 15% of the length L1 of the roller 300.

In addition to having features to rotationally couple the core 306 to the sheath 302, the support structure 304 includes features to radially support the sheath 302. For example, larger pieces of debris on the floor surface 10 may cause the sheath 302 to deform inwardly, and the radial support features can limit the amount of deformation at one or more locations along the length of the sheath 302. The radial support features inhibit radially inward deformation of the sheath 302 at multiple discrete locations along the length of the sheath 302. In the example depicted in FIG. 3D, the radial support features provide support at three distinct and separate locations along the length of the sheath 302.

For example, the radial support features of the support structure 304 include one or more portions of the core 306. The central portion 320 of the core 306 abuts the sheath 302 in a radial direction at a center 325 of the roller 300. In some implementations, outer tips of the locking members 322 of the core 304 abut the inner surface of the sheath 302 at the center 325 of the roller 300.

In addition, referring to FIGS. 3B and 3D, the radial support features of the support structure 304 include support members 326a, 326b mounted to the core 306. The support members 326a, 326b are discs formed of a deformable material, e.g., an elastomeric or rubber material. The support members 326a, 326b radially support portions of the sheath 302 to maintain a round or substantially circular shape of cross-sections of the shell 350 the sheath 302.

As shown in FIG. 3D, the support member 326a is proximate or on the first end portion 308 of the core 306, and the support member 326b is proximate or on the second end portion 310 of the core 306. The support members 326a, 326b are mounted to the core 306 through a press fit on an outer surface of the core 306. The support members 326a, 326b are each positioned proximate opposite longitudinal ends of the sheath 302 at a distance L4 from the center 325 of the roller 300. The distance L4 is between 60 mm and 100 mm, e.g., between 60 mm and 80 mm, between 60 mm and 70 mm, between 70 mm and 80 mm, between 80 mm and 100 mm, between 80 mm and 90 mm, 85 mm and 95 mm, or 90 mm and 100 mm. In some implementations, the distance L4 is between 30% and 45% of the overall length L1 of the roller 300, e.g., between 32.5% and 42.5% or 35% and 40% of the overall length L1 of the roller 300. The first and second support members 326a, 326b are each positioned at a distance L5 from first and second end portions 348a, 348b of the sheath 302, respectively. The distance L5 is between 20 mm and 40 mm, e.g., between 20 mm and 30 mm, 25 mm and 35 mm, or 30 mm and 40 mm. For example, the distance L5 is between 5% and 20% of the overall length L1 of the roller 300, e.g., between 5% and 15% or 10% and 20% of the length L1 of the roller 300.

The support members 326a, 326b extend radially outward from the outer surface of the core 306, e.g., the outer surface of the shaft portion 314, to proximate an inner surface of the sheath 302. The support members 326a, 326b contact or are configured to contact the inner surface of the sheath 302 when the sheath 302 inwardly deforms toward the longitudinal axis 312. The support members 326a, 326b radially support the sheath 302 to inhibit radially inward deformation of the sheath 302 beyond a certain amount at locations along the sheath 302 proximate the support members 326a, 326b.

Outer surfaces 328a, 328b of the support members 326a, 326b have a shape tracking a shape of the inner surface of the sheath 302. In this regard, the outer surfaces 328a, 328b are substantially circular and maintain circular cross-sectional shapes of the inner surface of the sheath 302 at the locations of the support members 326a, 326b. The longitudinal axis 312 is coincident with centers of the circular shapes defined by the outer surfaces 328a, 328b, e.g., coincident with central axes of the support members 326a, 326b. The outer surfaces 328a, 328b contact the inner surface of the sheath 302 to radially support the sheath 302.

The support members 326a, 326b are disc-shaped members with diameters matching diameters of the inner surface of the sheath 302 at the longitudinal locations of the support members 326a, 326b. Thicknesses T1 of the support members 326a, 326b, e.g., widths of the support members 326a, 326b along the longitudinal axis 312, are between 2.5 mm and 7.5 mm, e.g., between 3.5 mm and 6.5 mm, 4 mm and 6 mm, or 4.5 mm and 5.5 mm. For example, the thicknesses T1 are 0.5% to 3% of the length L1 of the roller 300, e.g., 0.5% to 2%, 1% to 2.5%, or 1.5% to 3% of the length L1 of the roller 300. In some implementations, the outer surfaces 328a, 328b of the support members 326a, 326b are sloped toward the center 325 of the roller 300 to match with the taper of the outer diameter of the shell 350 of the sheath 302 described herein.

The core 306 also includes features to maintain relative positions of the sheath 302 and the core 306 along the longitudinal axis 312 and relative positions of the support members 326a, 326b and the core 306 along the longitudinal axis 312. For example, the core 306 includes one or more locking members that abut the sheath 302 to inhibit movement of the sheath 302 in a first longitudinal direction 312a along the longitudinal axis 312, and one or more locking members that abut the sheath 302 to inhibit movement of the sheath 302 in a second opposite longitudinal direction 312b along the longitudinal axis 312.

Referring to the inset 330a shown in FIG. 4A, a locking member 332 on the core 306 is positioned in the central portion 320 of the core 306. The locking member 332 extends radially outward from the shaft portion 314. The locking member 332 abuts the sheath 302, e.g., abuts the locking members 324 of the sheath 302, to inhibit movement of the sheath 302 relative to the core 306 in the second direction 312b along the longitudinal axis 312. The locking member 332 extends radially outward from the shaft portion 314 of the core 306. In some implementations, the locking member 332 is a continuous ring of material positioned around the shaft portion 314.

Locking members 334 positioned in the central portion 320 of the core 306 extend radially outward from the shaft portion 314. The locking members 334 abut the sheath 302, e.g., abuts the locking members 324 of the sheath 302, to inhibit movement of the sheath 302 in the first direction 312a along the longitudinal axis 312 relative to the core 306, the first direction 312a being opposite the second direction 312b in which movement of the sheath 302 is inhibited by the locking member 332. As shown in the inset 330a in FIG. 4A, the locking members 334 each includes an abutment surface 334a that contacts a different one of the locking members 324 of the sheath 302. The abutment surface 334a faces the second end portion 310 of the core 306. The locking members 334 also each includes a sloped surface 334b, e.g., sloped toward the center 325 of the roller 300. The sloped surface 334b faces the first end portion 308 of the core 306. The sloped surface 334b can improve manufacturability of the roller 300 by enabling the sheath 302 and, in particular, the locking members 324 of the sheath 302, to be easily slid over the locking members 334 and then into contact with the locking member 332 during assembly of the roller 300.

The locking member 332 and the locking members 334 cooperate to define the longitudinal position of the sheath 302 over the core 306. When the sheath 302 is positioned over the core 306, the abutment surfaces 334a of the locking members 334 contact first longitudinal ends 324a, and the locking member 332 contacts second longitudinal ends 324b (shown in FIG. 5B) of the locking members 324 of the sheath 302 (shown in FIG. 5B).

The features that maintain the relative positions of the support members 326a, 326b and the core 306 along the longitudinal axis 312 include one or more locking members that abut the support members 326a, 326b to inhibit movement of the support members 326a, 326b in the first direction 312a along the longitudinal axis 312, and one or more locking members that abut the support members 326a, 326b to inhibit movement of the support members 326a, 326b in the second direction 312b along the longitudinal axis 312. Referring to the inset 330b shown in FIG. 4A, locking members 336 (only one shown in FIG. 4A) on the core 306 extend radially outward from the shaft portion 314. The locking members 336 abut the support member 326a to inhibit movement of the support member 326a relative to the core 306 in the second direction 312b. In particular, abutment surfaces 336a of the locking members 336 abut the support member 326a to inhibit movement of the support member 326a in the second direction 312b. The abutment surfaces 336a face the first end portion 308 of the core 306. Sloped surfaces 336b of the locking members 336, e.g., sloped toward the center 325 of the roller 300, enable the support member 326a to easily slide over the locking members 336 to position the support member 326a between the locking members 336 and a locking member 338. The sloped surfaces 336b face the second end portion 310 of the core 306. In this regard, during assembly, the support member 326a is slid over the second end portion 310 of the core 306, past the sloped surfaces 336b, and into the region between the locking members 336 and the locking member 338.

The locking member 338 on the core 306 extends radially outward from the shaft portion 314. The locking member 338 abuts the support member 326a to inhibit movement of the support member 326a relative to the core 306 in the second direction 312b. In some implementations, the locking member 338 is a continuous ring of material positioned around the shaft portion 314.

The locking members 336 and the locking member 338 cooperate to define the longitudinal position of the support member 326a over the core 306. When the support member 326a is positioned over the core 306, the locking member 332 contacts first longitudinal ends of the support member 326a, and the abutment surfaces 334a of the locking members 334 contact second opposite longitudinal ends of the support member 326a.

Referring to the inset 330c shown in FIG. 4A, locking members 340 and locking members 342 on the core 306 abut the support member 326b to inhibit movement of the support member 326a relative to the core 306 in the second direction 312b and the first direction 312a, respectively. The locking members 340, their abutment surfaces 340a, and their sloped surfaces 340b are similar to the locking members 336, their abutment surfaces 336a, and their sloped surfaces 336b to enable the support member 326b to be easily slid over the locking members 340 and into abutment with the locking member 342. The abutment surfaces 340a differ from the abutment surfaces 336a in that the abutment surfaces 340a face the second end portion 310 of the core 306, and the sloped surfaces 340b differ from the sloped surfaces 336b in that the sloped surfaces 340b face the first end portion 308 of the core 306. In this regard, the support member 326b is slid over the first end portion 308 of the core 306 to position the support member 326b in the region between the locking members 340 and the locking members 342.

In some implementations, the locking members 342 differs from the locking member 338 in that the locking members 342, rather than being formed from a continuous ring of material protruding from the shaft portion 314, are distinct protrusions extending from the shaft portion 314. The circumferential spacing between the locking members 342 and the locking members 340 enables the sheath 302 with its locking members 324 to be easily slid past the locking members 340, 342 in the first direction 312a during assembly of the roller 300.

The locking members 332, 334, 336, 338, 340, 342 are each positioned around the shaft portion 314 and can each be integrally molded to the core 306 such that the shaft portion 314 and the locking members 332, 334, 336, 338, 340, 342 form a single component, e.g., a single plastic component. For positioning the sheath 302 and the support members 326a, 326b over the core 306, the locking members 332, 334, 336, 338, 340, 342 can have similar diameters D4 shown in FIG. 4B. In some implementations, the outer diameter D4 is between 10 and 20 mm, e.g., between 10 mm and 15 mm, 12.5 mm and 17.5 mm, between 15 mm and 20 mm. For example, the outer diameter D4 is equal to the outer diameters D2 of the locking members 322 on the core 306. The outer diameter D4 is 1 to 5 mm greater than the diameter D1 of the shaft 314, e.g., 1 to 3 mm, 2 to 4 mm, or 3 to 5 mm greater than the diameter D1 of the shaft 314.

While the support structure 304 supports the sheath 302 and is interlocked with the sheath 302 at one or more portions of the sheath 302, the sheath 302 is radially unsupported and circumferentially unsupported along some portions of the sheath 302. Referring back to FIG. 3D, the support members 326a, 326b and the central portion 320 of the core 306 form a support system that radially support the sheath 302 at three distinct portions 344a, 344b, 344c. The inner surface of the sheath 302 is directly radially or transversally supported at the supported portions 344a, 344b, 344c. For example, the supported portion 344a and the support member 326a form a cylindrical joint in which relative sliding along the longitudinal axis 312 and relative rotation about the longitudinal axis 312 are allowed while other modes of motion are inhibited. The supported portion 344c and the support member 326b also form a cylindrical joint. Relative motion along or about the longitudinal axis 312 is accompanied with friction between the supported portions 344a, 344b and the support members 326a, 326b. The supported portion 344b and the central portion 320 of the core 306 form a rigid joint in which relative translation and relative rotation between the supported portion 344b and the central portion 320 are inhibited.

The sheath 302 is unsupported at portions 346a, 346b, 346c, 346d. The unsupported portion 346a corresponds to the portion of the sheath 302 between a first end portion 348a of the sheath 302 and the supported portion 344a, e.g., between the first end portion 348a of the sheath 302 and the support member 326a. The unsupported portion 346b corresponds to the portion of the sheath 302 between the supported portion 344a and the supported portion 344b, e.g., between the support member 326a and the center 325 of the roller 300. The unsupported portion 346c corresponds to the portion of the sheath 302 between the supported portion 344b and the supported portion 344c, e.g., between the center 325 of the roller 300 and the support member 326b. The unsupported portion 346d corresponds to the portion of the sheath 302 between the supported portion 344b and a second end portion 348b of the sheath 302, e.g., between the support member 326b and the second end portion 348b of the sheath 302.

The unsupported portions 346b, 346c overlie internal air gaps 352a, 352b defined by the sheath 302 and the support structure 304. The air gap 352a of the roller 300 corresponds to a space between the outer surface of the core 306, the support member 326a, and the inner surface of the sheath 302. The air gap 352b corresponds to a space between the outer surface of the core 306, the support member 326b, and the inner surface of the sheath 302. The air gaps 352a, 352b extend longitudinally along entire lengths of the unsupported portions 346b, 346c from the central portion 320 of the core 306 to the support members 326a, 326b. The air gaps 352a, 352b separate the support structure 304 from the sheath 302 along the unsupported portions 346b, 346c. These air gaps 352a, 352b enable the sheath 302 to deform inwardly toward the longitudinal axis 312 into the air gaps 352a, 352b, e.g., due to contact with debris on the floor surface during a cleaning operation.

The supported portions 344a, 344b, 344c deform relatively less than the unsupported portions 346a, 346b, 346c, 346d when the sheath 302 of the roller 300 contacts objects, such as the floor surface 10 and debris on the floor surface 10. In some cases, the unsupported portions 346a, 346b, 346c, 346d of the sheath 302 deflect in response to contact with the floor surface 10, while the supported portions 344a, 344b, 344c are radially compressed with little inward deflection compared to the inward deflection of the unsupported portions 346a, 346b, 346c, 346d. The amount of radial compression of the supported portions 344a, 344b, 344c is less than the amount of radial deflection of the unsupported portions 346a, 346b, 346c, 346d because the supported portions 344a, 344b, 344c are supported by material that extends radially toward the shaft portion 314, e.g., supported by the support members 326a, 326b and the central portion 320 of the core 306.

The unsupported portions 346a, 346d have lengths L5 between 15 and 25 mm, e.g., between 15 mm and 20 mm, 17.5 mm and 22.5 mm, or 20 mm and 25 mm. Each of the lengths L5 is 5% to 25% of the length L1 of the roller 300, e.g., between 5% and 15%, 10% and 20%, or 15% and 25% of the length L1 of the roller 300.

In some implementations, the sheath 302 contacts the core 306 only at the center 325 of the roller 300. Lengths L6, L7 corresponds to lengths of the air gaps 352a, 352b, e.g., the distance between the center 325 of the roller 300 and either of the support members 326a, 326b, the distance between the first longitudinal ends 324a of the locking member 324 and the first support member 326a, or the distance between the second longitudinal ends 324b of the locking member and the second support member 326b. The lengths L6, L7 are between 80 mm and 100 mm, e.g., between 80 mm and 90 mm, 85 mm and 95 mm, or 90 mm and 100 mm. For example, the lengths L6, L7 are equal to the distances L4 between either of the support members 326a, 326b and the center 325. Each of the lengths L6, L7 is between 25% and 45% of the length L1 of the roller 300, e.g., between 25% and 35%, 30% and 40%, or 35% and 45% of the length L1 of the roller 300. Each of the lengths L6, L7 is at least 25% of the length L1 of the roller 300, e.g., at least 30%, at least 35%, at least 40% or at least 45% of the length L1 of the roller 300. The combined value of the lengths L6, L7 is at least 50% of the length L1 of the roller 300, e.g., at least 60%, at least 70%, at least 80%, or at least 90% of the length L1 of the roller 300. In some implementations, the sheath 302 contacts the core 306 only at a point, e.g., at the center 325 of the roller 300, while in other implementations, the sheath 302 and the core 306 contact one another along a line extending along 25% to 100% of a length of the central portion 320 of the core 306.

As described herein, in addition to providing radial support to the sheath 302, the core 306 also provides circumferential support, in particular, by circumferentially abutting the sheath 302 with the central portion 320. For example, the circumferential support provided by the central portion 320 enables rotation of the core 306 to cause rotation of the sheath 302. In addition, when a torsional force is applied to the sheath 302 due to contact with an object, the sheath 302 substantially does not rotate relative to the core 306 at the central portion 320 of the core 306 because the sheath 302 is rotationally fixed to the core 306 at the central portion 320. In some implementations, the only location that the sheath 302 is rotationally supported is at the supported portion 344b of the sheath 302. In this regard, other portions of the sheath 302 can rotationally deform relative to the supported portion 344b and thereby rotate relative to the core 306.

In some implementations, the support members 326a, 326b provide circumferential support by generating a frictional reaction force between the support members 326a, 326b and the sheath 302. When a torque is applied to the core 306 and hence the support members 326a, 326b rotationally coupled to the core 306, a portion of the torque may transfer to the sheath 302. Similarly, when a torque is applied to the sheath 302, a portion of the torque may transfer to the core 306. However, during a cleaning operation, the sheath 302 will generally experience torques due to contact between the sheath 302 and an object that will be sufficiently great to cause relative rotation between portions of the sheath 302 and the support members 326a, 326b, e.g., between the support members 326a, 326b and portions of the sheath 302 overlying the support members 326a, 326b. This allowed relative rotation can improve debris pickup by the sheath 302.

The sheath 302 extends beyond the core 304 of the support structure 303 along the longitudinal axis 312 of the roller 300, in particular, beyond the first end portion 308 and the second end portion 310 of the core 306. The shell 350 of the sheath 302 includes a first half 354 and a second half 356. The first half 354 corresponds to the portion of the shell 350 on one side of a central plane 327 passing through the center 325 of the roller 300 and perpendicular to the longitudinal axis 312 of the roller 300. The second half 356 corresponds to the other portion of the shell 350 on the other side of a central plane 327. The central plane 327 is, for example, a bisecting plane that divides the roller 300 into two symmetric halves. The shell 350 has a wall thickness between 0.5 mm and 3 mm, e.g., 0.5 mm to 1.5 mm, 1 mm to 2 mm, 1.5 mm to 2.5 mm, or 2 mm to 3 mm.

Referring to FIG. 3D, the roller 300 includes a first collection well 358 and a second collection well 360. The collection wells 358, 360 correspond to volumes on ends of the roller 300 where filament debris engaged by the roller 300 tend to collect. In particular, as the roller 300 engages filament debris on the floor surface 10 during a cleaning operation, the filament debris moves over the end portions 348a, 348b of the sheath 302, wraps around the core 306, and then collects within the collection wells 358, 360. The filament debris wraps around the first and second end portions 308, 310 of the core 306 and can be easily removed from the elongate the first and second end portions 308, 310 by the user. In this regard, the first and second end portions 308, 310 are positioned within the collection wells 358, 360. The collection wells 358, 360 are defined by the sheath 302 and the support members 326a, 326b. The collection wells 358, 360 are defined by the unsupported portions 346a, 346d of the sheath 302 that extend beyond the support members 326a, 326b.

The first collection well 358 is positioned within the first half 354 of the shell 350. The first collection well 358 is, for example, defined by the support member 326a, the unsupported portion 346a of the sheath 302, and the portion of the core 306 extending through the unsupported portion 346a of the sheath 302. The length L5 of the unsupported portion 346a of the sheath 302 defines the length of the first collection well 358.

The second collection well 360 is positioned within the second half 356 of the shell 350. The second collection well 360 is, for example, defined by the support member 326b, the unsupported portion 346b of the sheath 302, and the portion of the core 306 extending through the unsupported portion 346b of the sheath 302. The length L5 of the unsupported portion 346d of the sheath 302 defines the length of the second collection well 360.

Referring to FIG. 5A, in some implementations, the sheath 302 of the roller 300 is a monolithic component including the shell 350 and cantilevered vanes extending substantially radially from the outer surface of the shell 350. Each vane has one end fixed to the outer surface of the shell 350 and another end that is free. The height of each vane is defined as the distance from the fixed end at the shell 350, e.g., the point of attachment to the shell 350, to the free end. The free end sweeps an outer circumference of the sheath 302 during rotation of the roller 300. The outer circumference is consistent along the length of the roller 300. Because the radius from the longitudinal axis 312 to the outer surface of the shell 350 decreases from the end portions 348a, 348b of the sheath 302 to the center 325, the height of each vane increases from the end portions 348a, 348b of the sheath 302 to the center 325 so that the outer circumference of the roller 300 is consistent across the length of the roller 300. In some implementations, the vanes are chevron shaped such that each of the two legs of each vane starts at opposing end portions 348a, 348b of the sheath 302, and the two legs meet at an angle at the center 325 of the roller 300 to form a "V" shape. The tip of the V precedes the legs in the direction of rotation.

FIGS. 5A and 5B depict one example of the sheath 302 including one or more vanes on an outer surface of the shell 350. While a single vane 362 is described herein, the roller 300 includes multiple vanes in some implementations, with each of the multiple vanes being similar to the vane 362 but arranged at different locations along the outer surface of the shell 350. For example, the sheath 302 includes 4 to 12 vanes, e.g., 4 to 8 vanes, 6 to 10 vanes, or 8 to 12 vanes. The vane 362 is a deflectable portion of the sheath 302 that, in some cases, engages with the floor surface 10 when the roller 300 is rotated during a cleaning operation. The vane 362 extends along outer surfaces of the first half 354 and the second half 356 of the shell 350. The vane 362 extends radially outwardly from the sheath 302 and away from the longitudinal axis 312 of the roller 300. The vane 362 deflects when it contacts the floor surface 10 as the roller 300 rotates.

Referring to FIG. 5E, the vane 362 extends from a first end 362a fixed to the shell 350 and a second free end 362b. A height of the vane 362 corresponds to, for example, a height H1 measured from the first end 362a to the second end 362b, e.g., a height of the vane 362 measured from the outer surface of the shell 350. The height H1 of the vane 362 proximate the center 325 of the roller 300 is greater than the height H1 of the vane 362 proximate the first end portion 348a and the second portion 348b of the sheath 302. The height H1 of the vane 362 proximate the center of the roller 300 is, in some cases, a maximum height of the vane 362. In some cases, the height H1 of the vane 362 linearly decreases from the center 325 of the roller 300 toward the first end portion 348a of the sheath 302 and toward the second end portion 348b of the sheath 302. In some implementations, the vane 362 is angled rearwardly relative to a direction of rotation 363 of the roller 300 such that the vane 362 more readily deflects in response to contact with the floor surface 10.

Referring to FIG. 5D, the vane 362 follows, for example, a V-shaped path 366 along the outer surface of the shell 350. The V-shaped path 366 includes a first leg 366a and a second leg 366b that extend from the central plane 327 toward the first end portion 348a and the second end portion 348b of the sheath 302, respectively. The first and second legs 366a, 366b extend circumferentially along the outer surface of the shell 350, in particular, in the direction of rotation 363 of the roller 300. The height H1 of the vane 362 decreases along the first leg 366a of the path 366 from the central plane 327 toward the first end portion 348a of the sheath 302, and the height H1 of the vane 362 decreases along the second leg 366b of the path 366 from the central plane 327 toward the second end portion 348b of the sheath 302. In some cases, the height of the vanes 362 decreases linearly from the central plane 327 toward the second end portion 348b and decreases linearly from the central plane 327 toward the first end portion 348a.

In some cases, an outer diameter D5 of the sheath 302 corresponds to a distance between free ends 362b, 364b of vanes 362, 364 arranged on opposite sides of a plane through the longitudinal axis 312 of the roller 300. The vane 364, having a fixed end 364a and a free end 364b, is similar to the vane 362 except that it extends along a different path along the outer surface of the shell 350. The outer diameter D5 of the sheath 302 is, in some cases, uniform across the entire length of the sheath 302. In this regard, despite the taper of the halves 354, 356 of the shell 350, the outer diameter of the sheath 302 is uniform across the length of the sheath 302 because of the varying height of the vanes 362, 364 of the sheath 302.

Figure 6:
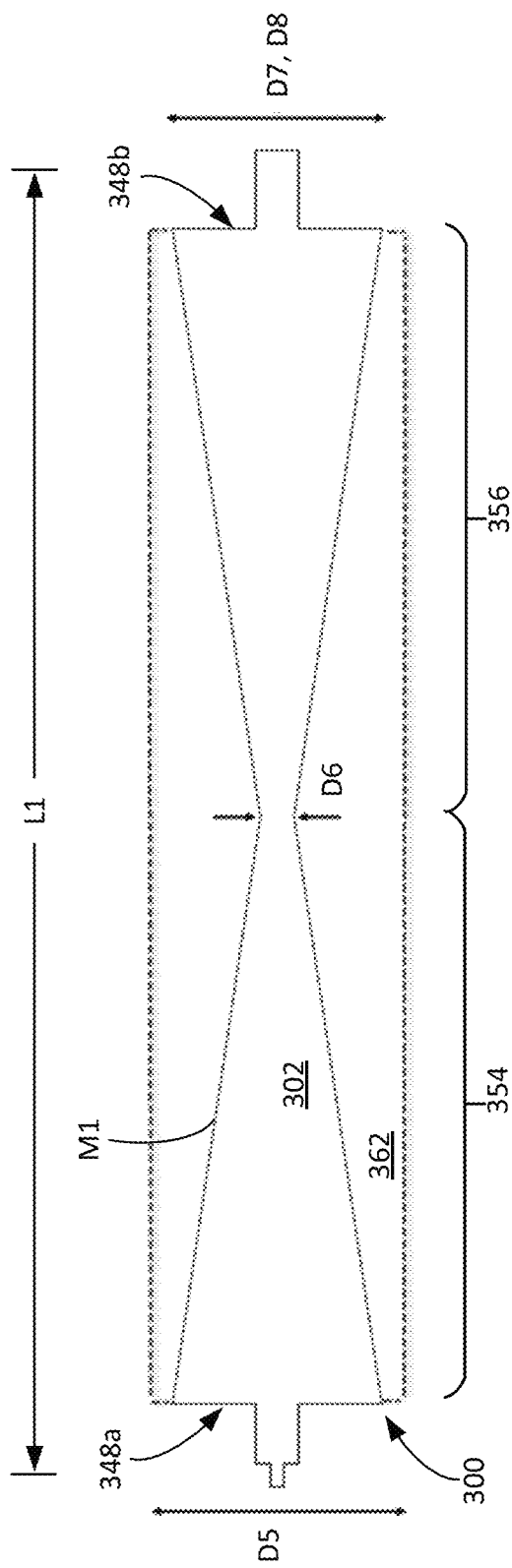
FIG. 6 is a schematic diagram of the cleaning roller of FIG. 3A.

In some implementations, as shown in FIG. 6, a width or diameter of the roller 300 between the end portion 348a and the end portion 348b of the sheath 302 corresponds to the diameter D5 of the sheath 302. The diameter D5 is, in some cases, uniform from the end portion 348a to the end portion 348b of the sheath 302. The diameter D5 of the roller 300 at different positions along the longitudinal axis 312 of the roller 300 between the position of the end portion 348a and the position of the end portion 348b is equal. The diameter D5 is between, for example, 20 mm and 60 mm, e.g., between 20 mm and 40 mm, 30 mm and 50 mm, 40 mm and 60 mm, etc.

Referring to FIG. 5E, the height H1 of the vane 362 is, for example, between 0.5 mm and 25 mm, e.g., between 0.5 and 2 mm, 5 and 15 mm, 5 and 20 mm, 5 and 25 mm, etc. The height H1 of the vane 362 at the central plane 327 is between, for example, 2.5 and 25 mm, e.g., between 2.5 and 12.5 mm, 7.5 and 17.5 mm, 12.5 and 25 mm, etc. The height H1 of the vane 362 at the end portions 348a, 348b of the sheath 302 is between, for example, 0.5 and 5 mm, e.g., between 0.5 and 1.5 mm, 0.5 and 2.5 mm, etc. The height H1 of the vane 362 at the central plane 327 is, for example, 1.5 to 50 times greater than the height H1 of the vane 362 at the end portions 348a, 348b of the sheath 302, e.g., 1.5 to 5, 5 to 10, 10 to 20, 10 to 50, etc., times greater than the height H1 of the vane 362 at the end portions 348a, 348b of the sheath 302. The height H1 of the vane 362 at the central plane 327, for example, corresponds to the maximum height of the vane 362, and the height H1 of the vane 362 at the end portions 348a, 348b of the sheath 302 corresponds to the minimum height of the vane 362. In some implementations, the maximum height of the vane 362 is 5% to 45% of the diameter D5 of the sheath 302, e.g., 5% to 15%, 15% to 30%, 30% to 45%, etc., of the diameter D5 of the sheath 302.

Referring to FIG. 3D, the shell 350 of the sheath 302 tapers along the longitudinal axis 312 of the roller 300 toward the center 325, e.g., toward the central plane 327. Both the first half 354 and the second half 356 of the shell 350 taper along the longitudinal axis 312 toward the center 325, e.g., toward the central plane 327, over at least a portion of the first half 354 and the second half 356, respectively. In some implementations, the first half 354 tapers from the first outer end portion 348a to the center 325, and the second half 356 tapers from the second outer end portion 348b to the center 325. In some implementations, rather than tapering toward the center 325 along an entire length of the sheath 302, the shell 350 of the sheath 302 tapers toward the center 325 along the unsupported portions 346b, 346c and does not taper toward the center 325 along the unsupported portions 346a, 346d.

In this regard, the first half 354 and the second half 356 are frustoconically shaped. Central axes of the frustocones formed by the first half 354, the second half 356 each extends parallel to and through the longitudinal axis 312 of the roller 300. Accordingly, the inner surfaces defined by the unsupported portions 346a, 346b, 346c, 346d are each frustoconically shaped and tapered toward the center 325 of the roller 300. Furthermore, the air gaps 352a, 352b are frustoconically shaped and tapered toward the center 325 of the roller 300.

An outer diameter D6 of the shell 350 at the central plane 327 is, for example, less than outer diameters D7, D8 of the shell 350 at the outer end portions 348a, 348b of the sheath 302. In some cases, the outer diameter of the shell 350 linearly decreases toward the center 325.

The diameter of the shell 350 of the sheath 302 may vary at different points along the length of the shell 350. The diameter D6 of the shell 350 along the central plane 327 is between, for example, 7 mm and 22 mm, e.g., between 7 and 17 mm, 12 and 22 mm, etc. The diameter D6 of the shell 350 along the central plane 327 is, for example, defined by the distance between outer surfaces of the shell 350 along the central plane 327. The diameters D7, D8 of the shell 350 at the outer end portions 348a, 348b of the sheath 302 are, for example, between 15 mm and 55 mm, e.g., between 15 and 40 mm, 20 and 45 mm, 30 mm and 55 mm, etc.

The diameter D6 of the shell 350 is, for example, between 10% and 50% of the diameter D8 of the sheath 302, e.g., between 10% and 20%, 15% and 25%, 30% and 50%, etc., of the diameter D8. The diameters D6, D7 of the shell 350 is, for example, between 80% and 95% of the diameter D8 of the sheath 302, e.g., between 80% and 90%, 85% and 95%, 90% and 95%, etc., of the diameter D8 of the sheath 302.

In some implementations, the diameter D6 corresponds to the minimum diameter of the shell 350 along the length of the shell 350, and the diameters D7, D8 correspond to the maximum diameter of the shell 350 along the length of the shell 350. In the example depicted in FIG. 1A, the length S2 of the separation 108 is defined by the maximum diameters of the shells of the rollers 104a, 104b. The length S3 of the separation 108 is defined by the minimum diameters of the shells of the rollers 104a, 104b.

The diameter of the shell 350 also varies linearly along the length of the shell 350 in some examples. From the minimum diameter to the maximum diameter along the length of the shell 350, the diameter of the shell 350 increases with a slope M1. The slope M1 is between, for example, 0.01 to 0.4 mm/mm, e.g., between 0.01 to 0.3 mm/mm, 0.05 mm to 0.35 mm/mm, etc. The angle between the slope M1 and the longitudinal axis 312 is between, for example, 0.5 degrees and 20 degrees, e.g., between 1 and 10 degrees, 5 and 20 degrees, 5 and 15 degrees, 10 and 20 degrees, etc. In particular, the slope M1 corresponds to the slope of the frustocones defined by the first and second halves 354, 356 of the shell 350.

When the roller 300 is paired with another roller, e.g., the roller 104b, the outer surface of the shell 350 of the roller 300 and the outer surface of the shell 350 of the other roller defines a separation therebetween, e.g., the separation 108 described herein. The rollers define an air opening therebetween, e.g., the air opening 109 described herein. Because of the taper of the first and second halves 354, 356 of the shell 350, the separation increases in size toward the center 325 of the roller 300. The frustoconical shape of the halves 354, 356 facilitate movement of filament debris picked up by the roller 300 toward the end portions 348a, 348b of the sheath 302. The filament debris can then be collected into the collection wells 358, 360 such that a user can easily remove the filament debris from the roller 300. In some examples, the user dismounts the roller 300 from the robot to enable the filament debris collected within the collection wells 358, 360 to be removed.

In some cases, the air opening varies in size because of the taper of the first and second halves 354, 356 of the shell 350. In particular, the width of the air opening depends on whether the vanes 362, 364 of the roller 300 face the vanes of the other roller. While the width of the air opening between the sheath 302 of the roller 300 and the sheath of the other roller varies along the longitudinal axis 312 of the roller 300, the outer circumferences of the rollers are consistent. As described with respect to the roller 300, the free ends 362b, 364b of the vanes 362, 364 define the outer circumference of the roller 300. Similarly, free ends of the vanes of the other roller define the outer circumference of the other roller. If the vanes 362, 364 face the vanes of the other roller, the width of the air opening corresponds to a minimum width between the roller 300 and the other roller, e.g., a distance between the outer circumference of the shell 350 of the roller 300 and the outer circumference of the shell of the other roller. If the vanes 362, 364 of the roller and the vanes of the other roller are positioned such that the width of the air opening is defined by the distance between the shells of the rollers and corresponds to a maximum width between the rollers, e.g., between the free ends 362b, 362b of the vanes 362, 364 of the roller 300 and the free ends of the vanes of the other roller.

Alternative Implementations

A number of implementations have been described. Nevertheless, it will be understood that various modifications may be made.

While the robot 102 is described as having a rectangular shaped front portion 202a and a semicircular shaped rear portion 202b, in some implementations, an outer perimeter of the robot 102 defines another appropriate shape. For example, in some cases, the body 200 of the robot 102 has a substantially circular shape. Alternatively, the body 200 of the robot 102 has a substantially rectangular shape, a substantially square shape, a substantially ellipsoidal shape, or a substantially Reuleaux polygonal shape.

While some of the foregoing examples are described with respect to a single roller 300 or the roller 104a, the roller 300 is similar to the front roller 104b with the exception that the arrangement of vanes 362 of the roller 300 differ from the arrangement of the vanes 224b of the front roller 104b, as described herein. In particular, because the roller 104b is a front roller and the roller 104a is a rear roller, the V-shaped path for a vane 224a of the roller 104a is symmetric to the V-shaped path for a vane 224b of the roller 104b, e.g., about a vertical plane equidistant to the longitudinal axes 126a, 126b of the rollers 104a, 104b. The legs for the V-shaped path for the vane 224b extend in the counterclockwise direction 130b along the outer surface of the shell 222b of the roller 104b, while the legs for the V-shaped path for the vane 224a extend in the clockwise direction 130a along the outer surface of the shell 222a of the roller 104a.

While the supported portion 344b is described as being positioned at the center 325 of the roller 300, in some implementations, the central portion 320 of the core 306 supports the sheath 302 at a location offset from the center 325 of the roller 300, e.g., offset from the center 325 by 1 cm to 5 cm. In some implementations, the support members 326a, 326b are symmetrically arranged around the central plane 327 and are equidistant from the center 325 of the roller 300. In other implementations, one of the support members 326a, 326b is positioned at a distance further from the center 325 than a distance between the other of the support members 326a, 326b and the center 325.

While filament debris is described as being collected in the collection well 358, in some implementations, the filament debris is collected on the mounting device 316. For example, the mounting device 316 includes a recessed ring-shaped portion (with a center coincident with the longitudinal axis 312) where the filament debris is collected.

Figures 7A, 7B:
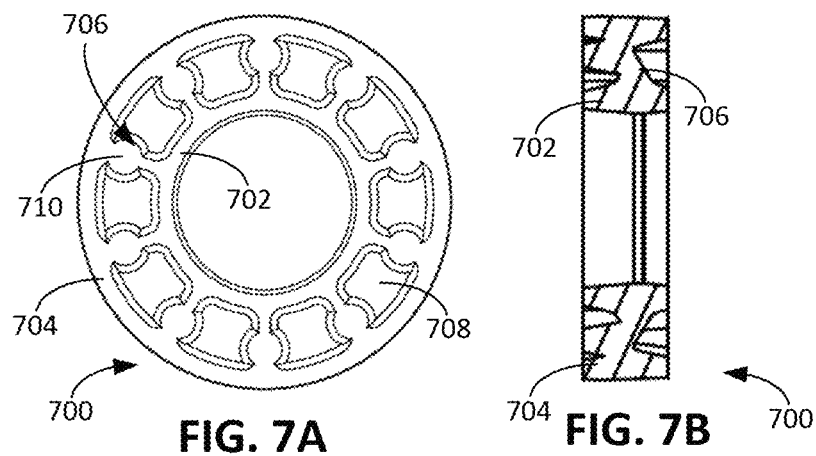
FIGS. 7A, 8A, and 9A are side views of, and FIGS. 7B, 8B, and 9B are front views of examples of support members.

The support members 326a, 326b have circular outer perimeters. Geometry of interior portions of the support members 326a, 326b, e.g., portions within the circular outer perimeters, can vary between implementations. FIGS. 7A and 7B illustrate an example of a support member 700 that can be used as a support member for a cleaning roller, e.g., the roller 300. The support member 700 includes an inner ring 702, an outer ring 704, and elongate members 706 extending between the inner ring 702 and the outer ring 704. The inner ring 702, when the support member 700 is mounted to the core 306 of the roller 300, is coupled to the core 306. The inner ring 702 abuts the locking members 336, 338 (if the support member 700 corresponds to the first support member 326a) or abuts the locking members 340, 342 (if the support member 700 corresponds to the second support member 326b). The outer ring 704 contacts the inner surface of the sheath 302 to provide radial support to the sheath 302.

The elongate members 706 extend along and parallel to radial axes extending outwardly from a center of the support member 700. The elongate members 706 are structural support members for the outer ring 704 to provide radial support to the sheath 302. Adjacent elongate members 706 define gaps 708, thereby reducing the amount of material required to form the support member 700. The elongate members 706 include protruding portions 710 to increase the stiffness of the elongate members 706 and thereby provide more radial support for the sheath 302 of the roller 300.

Figures 8A, 8B:
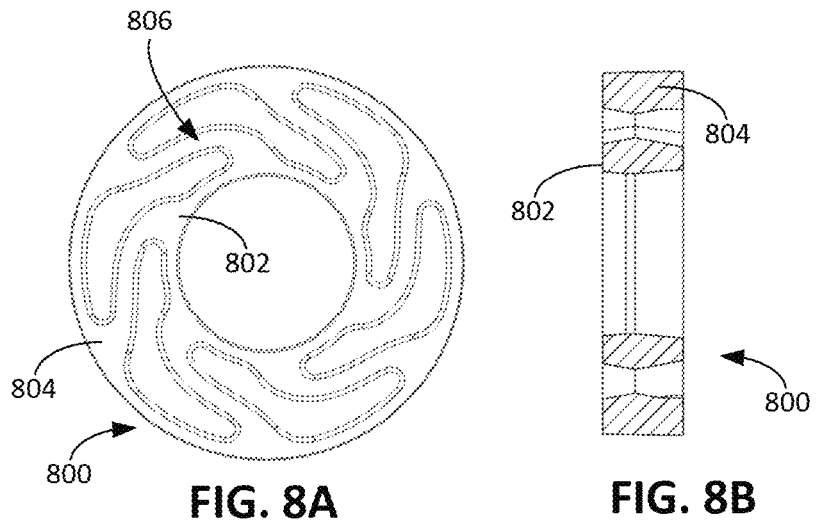

FIGS. 8A and 8B illustrate another example of a support member 800 that can be used as a support member for the roller 300. The support member 800 includes an inner ring 802 and an outer ring 804 similar to the inner ring 702 and the outer ring 704. The support member 800 differs from the support member 700 in that elongate members 806 of the support member 800 are angled relative to radially extending axes of the support member 800. In particular, the elongate members 806 and a radial axis (e.g., an axis perpendicular to a central axis through the center of the support member 800) form a non-zero angle. In some implementations, this non-zero angle is between 15 and 80 degrees, e.g., between 15 and 30 degrees, between 30 and 45 degrees, between 45 and 60 degrees, between 60 and 80 degrees, between 30 and 80 degrees, or between 50 and 80 degrees. The elongate members 806, when the support member 800 is mounted to the core 306, are angled away from the direction of rotation 363 (shown in FIG. 5D), e.g., extend outward from the inner ring 702 at a non-perpendicular angle relative to the direction of rotation 363. The elongate members 806 are angled such that torsion applied to the outer ring 704 during rotation of the roller 300 tends to cause the elongate members 806 to extend.

Figures 9A, 9B:
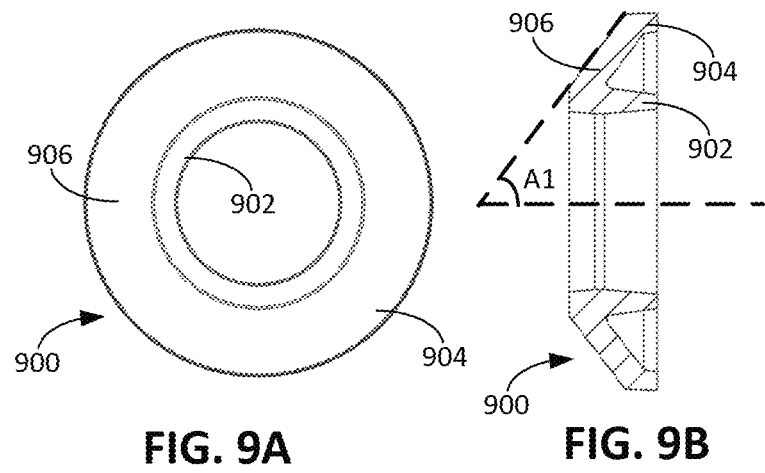

FIGS. 9A and 9B illustrate another example of a support member 900 that can be used as a support member for the roller 300. The support member 900 differs from the support members 700 and 800 in that the support member 900 includes an inner ring 902 and an outer ring 904 similar to the inner rings 702, 802 and the outer rings 804, 904, with the inner ring 902 abutting the locking members of the core 306, and the outer ring 904 radially inwardly supporting the sheath 302. As shown in FIG. 9B, the support member 900 includes a support ring 906 that extends radially outward from the inner ring 902 to the outer ring 904 at a non-perpendicular angle to the longitudinal axis 312. The support ring 906 is a solid continuous ring of material connecting the inner ring 902 and the outer ring 904. The angle A1 between the support ring 906 and the longitudinal axis 312 is between 45 and 60 degrees, e.g., between 45 and 55 degrees or 50 and 60 degrees.

While the support members 326a, 326b are described as separate from the core 306, in some implementations, the support members 326a, 326b and the core 306 are integrally formed with respect to one another. At least the support members 326a, 326b and the core 306 form a monolithic portion of the support structure 304.

While the support members 326a, 326b are described as maintaining the circular cross-section of the shell 350 of the sheath 302 at locations at which the support members 326a, 326b support the shell 350, in some implementations, the support members 326a, 326b are also deformable. In some implementations, the support members 326a, 326b are deformable such that their outer surfaces 328a, 328b become non-circular in response to deformation. The support members 326a, 326b deform in response to deformation of the sheath 302. In this regard, while the supported portions 344a, 344c deform relatively less than the unsupported portions 346a-346d, the supported portions 344a, 344c are still capable of being deformed in response to contact with objects such as debris or the floor surface. As a result, the shell 350 of the sheath 302 can be deformed into non-circular cross-sections at the supported portions 344a, 344c.

While the roller 300 is described as having two support members 326a, 326b, in some implementations, the roller 300 includes 0, 1, or 3 or more support members. If the roller 300 includes 3 or more support members, the support member or support members in addition to the support members 326a, 326b can be positioned between the support members 326a, 326b and the central portion 320 of the core 306. In some implementations, the support members are uniformly spaced along the longitudinal axis 312 of the roller 300.

Figure 10A:
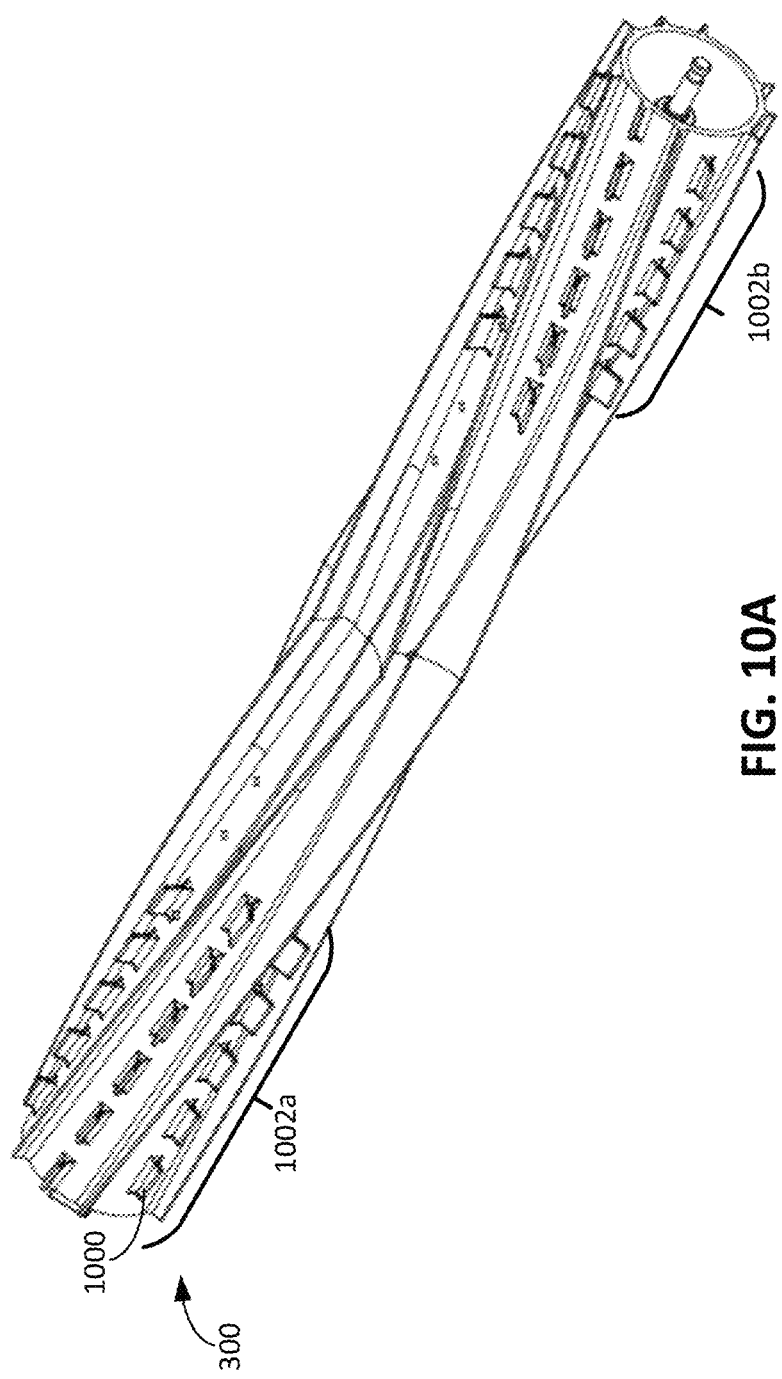
FIGS. 10A, 10B, and 10C are perspective, front, and side views of an example of a cleaning roller.
Figure 10B:
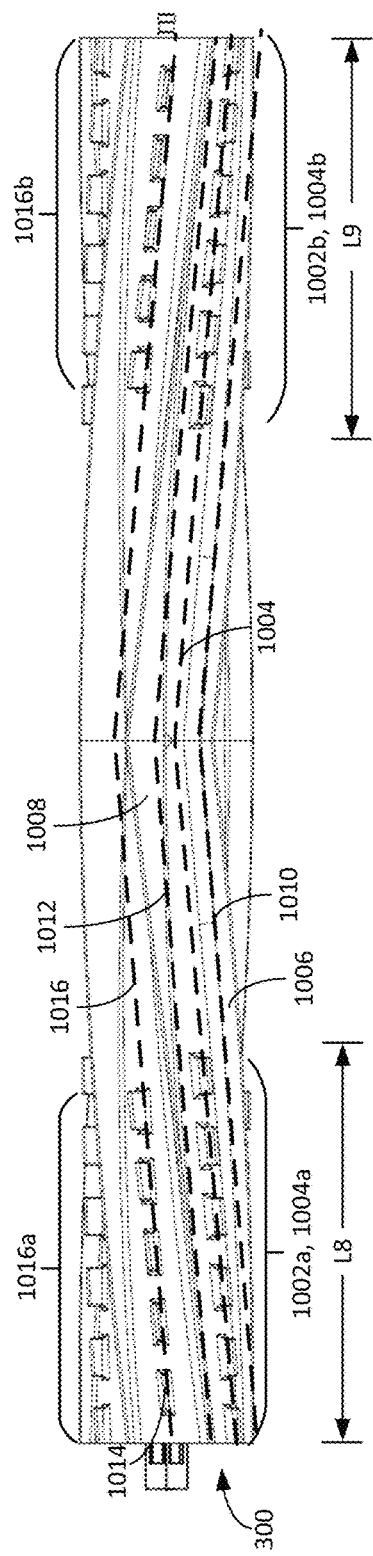
Figure 10C:
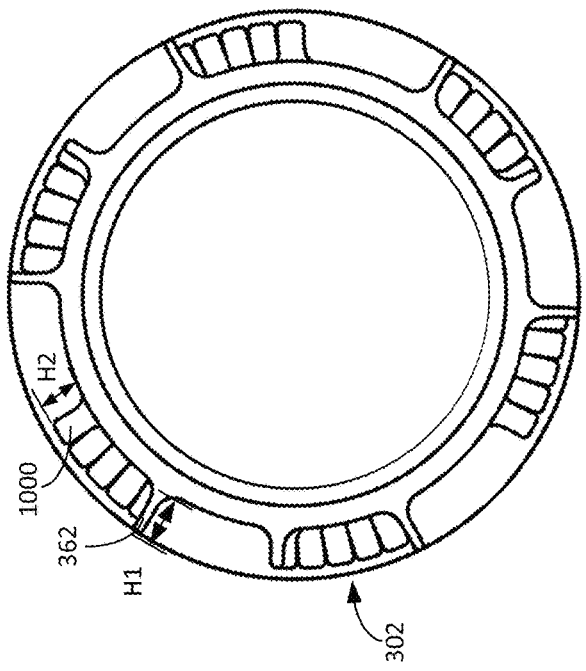

The sheath 302 is described as having vanes, e.g., the vanes 362, 364, extending along outer surfaces of the shell 350. In some implementations, as shown in FIGS. 10A and 10B, the sheath 302 further includes nubs 1000 extending radially outward from the outer surfaces of the shell 350. The nubs 1000 protrude radially outwardly from the outer surface of the shell 350 and are spaced apart from one another along the outer surface of the shell 350. A first portion 1002a of the nubs 1000 extends longitudinally from the first end portion 348a of the sheath 302 toward the center 325 of the roller 300 along a length L8. A second portion 1002b of the nubs 1000 extends longitudinally from the second end portion 348b of the sheath 302 toward the center 325 of the roller 300 along a length L9. The first portion 1002a of the nubs 1000 and the second portion 1002b of the nubs 1000 do not extend across an entire length L1 of the roller 300. The lengths L8, L9 are each 50 mm to 90 mm, e.g., 50 to 70 mm, 60 to 80 mm, or 70 to 90 mm. The lengths L8, L9 are 10% to 40% of the length L1 of the roller 300, e.g., between 10% and 20%, between 15% and 25%, between 15% and 35%, between 20% and 30%, between 25% and 35%, or between 30% and 40% of the length L1 of the roller 300.

The first portion 1002a of the nubs 1000 extends along a portion 1004a of a path 1004 circumferentially offset from the path 366 for the vane 362, and the second portion 1002b of the nubs 1000 extends along a portion 1004b of the path 1004. The path 1004 is a V-shaped path, and the portions 1004a, 1004b corresponds to portions of legs of the path 1004. In this regard, the path 1004 extends both circumferentially and longitudinally along the outer surface of the shell 350. The nubs 1000 each has a length of 2 to 5 mm, e.g., 2 to 3 mm, 3 to 4 mm, or 4 to 5 mm. The spacing between adjacent nubs 1000 along the path 1004 has a length of 1 to 4 mm, e.g., 1 to 2 mm, 2 to 3 mm, or 3 to 4 mm.

As described herein, the height H1 of the vane 362 relative to the longitudinal axis 312 is uniform across a length of the roller 300. In some implementations, referring to FIG. 10C, heights H2 of the nubs 1000 relative to the shell 350 of the sheath 302 are uniform along the portions 1004a, 1004b of the path 1004. The height H1 of the vane 362 is 0.5 to 1.5 mm greater than the heights H2 of the nubs 1000, e.g., 0.5 to 1 mm, 0.75 to 1.25 mm, or 1 to 1.5 mm greater than the heights H2 of the nubs 1000.

In some implementations, paths for the vanes are positioned between adjacent paths for nubs, and paths for nubs are positioned between adjacent paths for vanes. In this regard, the paths for nubs and the paths for vanes are alternately arranged around the outer surface of the shell 350. For example, the first portion 1002a of the nubs 1000 and the second portion 1002b of nubs 1000 are positioned between a first vane 1006, e.g., the vane 362, and a second vane 1008. The nubs 1000 form a first set of nubs 1000 extending along the portions 1004a, 1004b of the path 1004, and the first and second vanes 1006, 1008 extend along V-shaped paths 1010, 1012, respectively. The path 1004 is positioned circumferentially between the paths 1010, 1012. Nubs 1014 form a second set of nubs 1014 that extends along portions 1016a, 1016b of a path 1016. The path 1010 for the first vane 1006 is positioned circumferentially between the paths 1004, 1016 for the first and second set of nubs 1000, 1014.

In some implementations, the roller 104a and the roller 104b have different lengths. The roller 104b is, for example, shorter than the roller 104a. The length of the roller 104b is, for example, 50% to 90% the length of the roller 104a, e.g., 50% to 70%, 60% to 80%, 70% to 90% of the length of the roller 104a. If the lengths of the rollers 104a, 104b are different, the rollers 104a, 104b are, in some cases, configured such that the minimum diameter of the shells 222a, 222b of the rollers 104a, 104b are along the same plane perpendicular to both the longitudinal axes 126a, 126b of the rollers 104a, 104b. As a result, the separation between the shells 222a, 222b is defined by the shells 222a, 222b at this plane.

Accordingly, other implementations are within the scope of the claims.

What is claimed is:

1. A cleaning roller mountable to a cleaning robot, the cleaning roller comprising:
    a sheath comprising a shell, an outer diameter of the shell tapering from a first end portion of the sheath and a second end portion of the sheath toward a center of the roller; and
    a core extending from a first end portion of the core to a second end portion of the core along an axis of rotation of the roller, the first and second end portions of the core being mountable to the robot for rotating about the axis of rotation, wherein the core includes a central portion interlocked with the sheath to rotationally couple the core to the sheath and inhibit relative translation of the sheath and the core along the axis of rotation,
    wherein an inner surface of the sheath and an outer surface of the core define an air gap therebetween, the air gap extending from the central portion of the core longitudinally along the axis of rotation toward the first end portion or the second end portion of the core.

2. The cleaning roller of claim 1, further comprising:
    a first circular member proximate the first end portion of the core and extending radially outward from the outer surface of the core toward the inner surface of the sheath, and
    a second circular member proximate the second end portion of the core and extending radially outward from the outer surface of the core toward the inner surface of the sheath,
    wherein the core extends along the axis of rotation through centers of the first and second circular members.

3. The cleaning roller of claim 2, wherein the first and second circular members are configured to contact the inner surface of the sheath to radially support the sheath.

4. The cleaning roller of claim 2, wherein thicknesses of the first and second circular members are between 2.5 and 7.5 mm.

5. The cleaning roller of claim 2, wherein a distance between the first circular member and the center of the roller is between 60 and 100 mm, and a distance between the second circular member and the center of the roller is between 60 and 100 mm.

6. The cleaning roller of claim 2, wherein the first and second circular members each includes:
    an outer ring,
    an inner ring coupled to the core, and
    a plurality of elongate members extending between the outer ring and the inner ring.

7. The cleaning roller of claim 6, wherein each of the plurality of elongate members extends outward at a non-zero angle relative to a radial axis.

8. The cleaning roller of claim 2, wherein the core comprises:
    a first locking member abutting the first circular member in a first longitudinal direction and a second longitudinal direction to inhibit relative longitudinal translation of the core and the first circular member, and
    a second locking member abutting the second circular member in the first longitudinal direction and the second longitudinal direction to inhibit relative longitudinal translation of the core and the second circular member.

9. The cleaning roller of claim 2, wherein a surface of the first circular member proximate the inner surface of the sheath and a surface of the second circular member proximate the inner surface of the sheath are sloped toward the center of the roller.

10. The cleaning roller of claim 2, wherein a distance between the first circular member and the center of the roller is between 25% and 45% of a length of the roller and a distance between the second circular member and the center of the roller is between 25% and 45% of a length of the roller.

11. The cleaning roller of claim 1, wherein:
    the central portion of the core comprises one or more locking members extending radially outward from a shaft portion of the core, and
    the sheath comprises one or more locking members extending radially inward from an inner surface of the shell, the one or more locking members of the sheath abutting the one or more locking members of the central portion of the core in a first longitudinal direction and a second longitudinal direction.

12. The cleaning roller of claim 11, wherein the one or more locking members of the central portion of the core comprises a surface facing the second end portion of the core, the surface forming a non-perpendicular angle with the axis of rotation.

13. The cleaning roller of claim 11, wherein the one or more locking members of the sheath abut the one or more locking members of the central portion of the core in a direction of rotation of the roller.

14. The cleaning roller of claim 1, wherein the air gap has a length at least 25% of a length of the cleaning roller.

15. The cleaning roller of claim 1, wherein the sheath comprises:
    a vane extending radially outwardly from an outer surface of the shell and following a first path along the outer surface of the shell, and
    a plurality of nubs protruding radially outwardly from the outer surface of the shell and spaced apart from one another along the outer surface of the shell, each of the nubs following a portion of a second path circumferentially offset along the outer surface of the shell from the first path, a first portion of the nubs extending longitudinally from the first end portion of the sheath toward the center of the roller along 15% to 35% of a length of the roller, and a second portion of the nubs extending longitudinally from the second end portion of the sheath toward the roller of the sheath along 15% to 35% of the length of the roller.

16. The cleaning roller of claim 15, wherein a height of the vane relative to the axis of rotation is uniform across a length of the roller, and heights of the nubs are uniform along the portion of the second path relative to the axis of rotation, the height of the vane being 0.5 to 1.5 mm greater than the heights of the nubs.

17. The cleaning roller of claim 1, wherein the sheath comprises:
    a first vane extending radially outwardly from an outer surface of the shell and following a first path along the outer surface of the shell,
    a second vane extending radially outwardly from an outer surface of the shell and following a second path along the outer surface of the shell, the second path being circumferentially offset along the outer surface of the shell from the first path, and a plurality of nubs protruding radially outwardly from the outer surface of the shell and spaced apart from one another along the outer surface of the shell, each of the nubs following a portion of a third path circumferentially offset along the outer surface of the shell from the first path and the second path, wherein the third path is positioned along the outer surface of the shell between the first path and the second path.

18. The cleaning roller of claim 1, wherein a first half of the shell comprises a frustoconical portion tapering toward the center of the cleaning roller, and a second half of the shell comprises a frustoconical portion tapering toward the center of the cleaning roller.

19. An autonomous cleaning robot comprising:

a body;

a drive operable to move the body across a floor surface; and a cleaning assembly comprising a cleaning roller rotatable about an axis of rotation of the roller, the cleaning roller comprising a sheath comprising a shell, an outer diameter of the shell tapering from a first end portion of the sheath and a second end portion of the sheath toward a center of the roller;

a core extending from a first end portion of the core to a second end portion of the core along the axis of rotation of the roller, wherein the core includes a central portion interlocked with the sheath to rotationally couple the core to the sheath and inhibit relative translation of the sheath and the core along the axis of rotation, wherein an inner surface of the sheath and an outer surface of the core define an air gap therebetween, the air gap extending from the central portion of the core longitudinally along the axis of rotation toward the first end portion of the core or the second end portion of the core.

20. The robot of claim 19, wherein the roller comprises:

a first circular member proximate the first end portion of the core and extending radially outward from the outer surface of the core toward the inner surface of the sheath, and a second circular member proximate the second end portion of the core and extending radially outward from the outer surface of the core toward the inner surface of the sheath, wherein the core extends along the axis of rotation through centers of the first and second circular members.

21. The robot of claim 19, wherein:

the central portion of the core comprises one or more locking members extending radially outward from a shaft portion of the core, and the sheath comprises a locking member extending radially inward from an inner surface of the shell, the locking member of the sheath abutting the one or more locking members of the central portion of the core in a first longitudinal direction and a second longitudinal direction.

22. The robot of claim 19, wherein the sheath comprises:

a vane extending radially outwardly from an outer surface of the shell and following a first path along the outer surface of the shell, and a plurality of nubs protruding radially outwardly from the outer surface of the shell and spaced apart from one another along the outer surface of the shell, each of the nubs following a portion of a second path circumferentially offset along the outer surface of the shell from the first path, a first portion of the nubs extending longitudinally from the first end portion of the sheath toward the center of the roller along 15% to 35% of a length of the roller, and a second portion of the nubs extending longitudinally from the second end portion of the sheath toward the center of the roller along 15% to 35% of the length of the roller.

23. The robot of claim 19, wherein a first half of the shell comprises a frustoconical portion tapering toward the center of the cleaning roller, and a second half of the shell comprises a frustoconical portion tapering toward the center of the cleaning roller.

* * * * *